United States Patent
Izumi et al.

(10) Patent No.: US 6,728,534 B1
(45) Date of Patent: Apr. 27, 2004

(54) RADIO COMMUNICATION APPARATUS, HAVING COMBINED FUNCTIONS SUCH AS TERMINAL ADAPTER, DIGITAL RADIO COMMUNICATION APPARATUS, FACSIMILE COMMUNICATION APPARATUS AND SO ON, FOR BEING CONNECTED TO A DIGITAL PUBLIC COMMUNICATION LINE

(75) Inventors: Michihiro Izumi, Kashiwa (JP); Naoto Kagaya, Yokohama (JP); Akihiro Uchimi, Tokyo (JP); Hideya Tabeta, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 09/100,208

(22) Filed: Jun. 19, 1998

(30) Foreign Application Priority Data

Jun. 23, 1997 (JP) ............................. 9-165816
May 12, 1998 (JP) ........................... 10-128899

(51) Int. Cl.$^7$ ............................. H04Q 7/20; H04Q 7/32
(52) U.S. Cl. ................. 455/426.1; 455/556.1; 455/557; 379/100.01; 379/93.01
(58) Field of Search ................. 455/426, 403, 455/412, 550, 556, 557, 561, 554, 555, 414, 502, 445, 422, 424, 425; 370/280; 379/100.01, 100.02, 142.07, 93.01

(56) References Cited

U.S. PATENT DOCUMENTS

| | | | | |
|---|---|---|---|---|
| 5,420,692 A | | 5/1995 | Lin et al. ............... | 358/426 |
| 5,510,907 A | * | 4/1996 | Koichi ................. | 455/557 |
| 5,517,552 A | * | 5/1996 | Yamashita ............ | 455/556 |
| 5,598,412 A | | 1/1997 | Griffith et al. ......... | 370/352 |
| 5,600,709 A | | 2/1997 | Höflinger ............. | 379/61 |
| 5,608,545 A | * | 3/1997 | Kagawa ............... | 455/557 |
| 5,761,485 A | * | 6/1998 | Munyan ............... | 455/422 |
| 5,768,264 A | * | 6/1998 | Anderson et al. ...... | 370/280 |
| 5,805,582 A | * | 9/1998 | Snelling et al. ........ | 455/403 |
| 5,881,061 A | * | 3/1999 | Iizuka et al. .......... | 455/426 |
| 5,915,224 A | * | 6/1999 | Jonsson ............... | 455/414 |
| 5,930,719 A | * | 7/1999 | Babitch et al. ........ | 455/462 |
| 6,047,176 A | * | 4/2000 | Sakamoto et al. ...... | 455/422 |
| 6,055,441 A | * | 4/2000 | Wieand et al. ........ | 455/557 |
| 6,058,104 A | * | 5/2000 | Snelling et al. ........ | 455/422 |
| 6,243,372 B1 | * | 6/2001 | Petch et al. .......... | 455/502 |

FOREIGN PATENT DOCUMENTS

| | | |
|---|---|---|
| EP | 0 450 497 A2 | 10/1991 |
| EP | 0 526 106 A2 | 2/1993 |
| GB | 2 301 756 A | 12/1996 |
| JP | 8-223644 | 8/1996 |
| JP | 9-163453 | 6/1997 |

OTHER PUBLICATIONS

"*Standards Set for PHS Data Communication*" Issue Oct. 6, 1996, XP002224227.
Partial European Search Report dated Feb. 10. 2003.

* cited by examiner

*Primary Examiner*—William Trost
*Assistant Examiner*—Keith Ferguson
(74) *Attorney, Agent, or Firm*—Morgan & Finnegan, LLP

(57) ABSTRACT

A radio communication apparatus capable of executing communication and processing of audio data and image data by simplifying the system structure where various apparatuses are connected via a terminal adapter (TA), which conventionally used a large area and whose connection was complicated. More specifically, the system structure comprises: an interface unit (RS232C controller 219, driver 220, PIAFS controller 228, I.460 processor 236) connected with a data terminal (PC) by radio or by cable; radio communication unit (PHS engine unit 237) for realizing radio communication with a wireless telephone unit; and transmission arrangement (first port switch 229, second port switch 233, ISDN interface unit 225 and the like) for transmitting at least one of the data transmitted by the data terminal (PC) or the audio data transmitted by the wireless telephone unit, to the digital public communication line (ISDN).

29 Claims, 28 Drawing Sheets

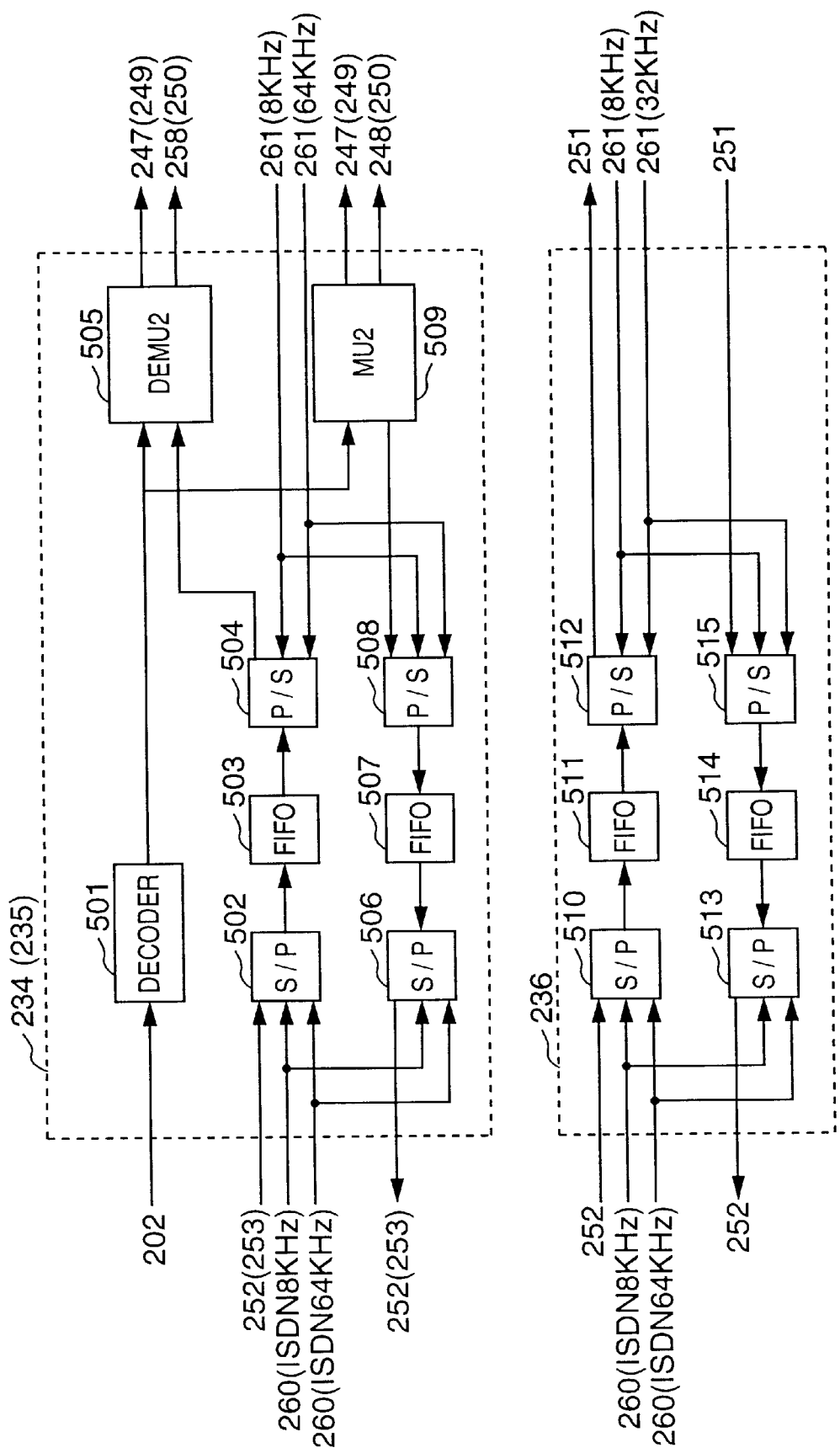

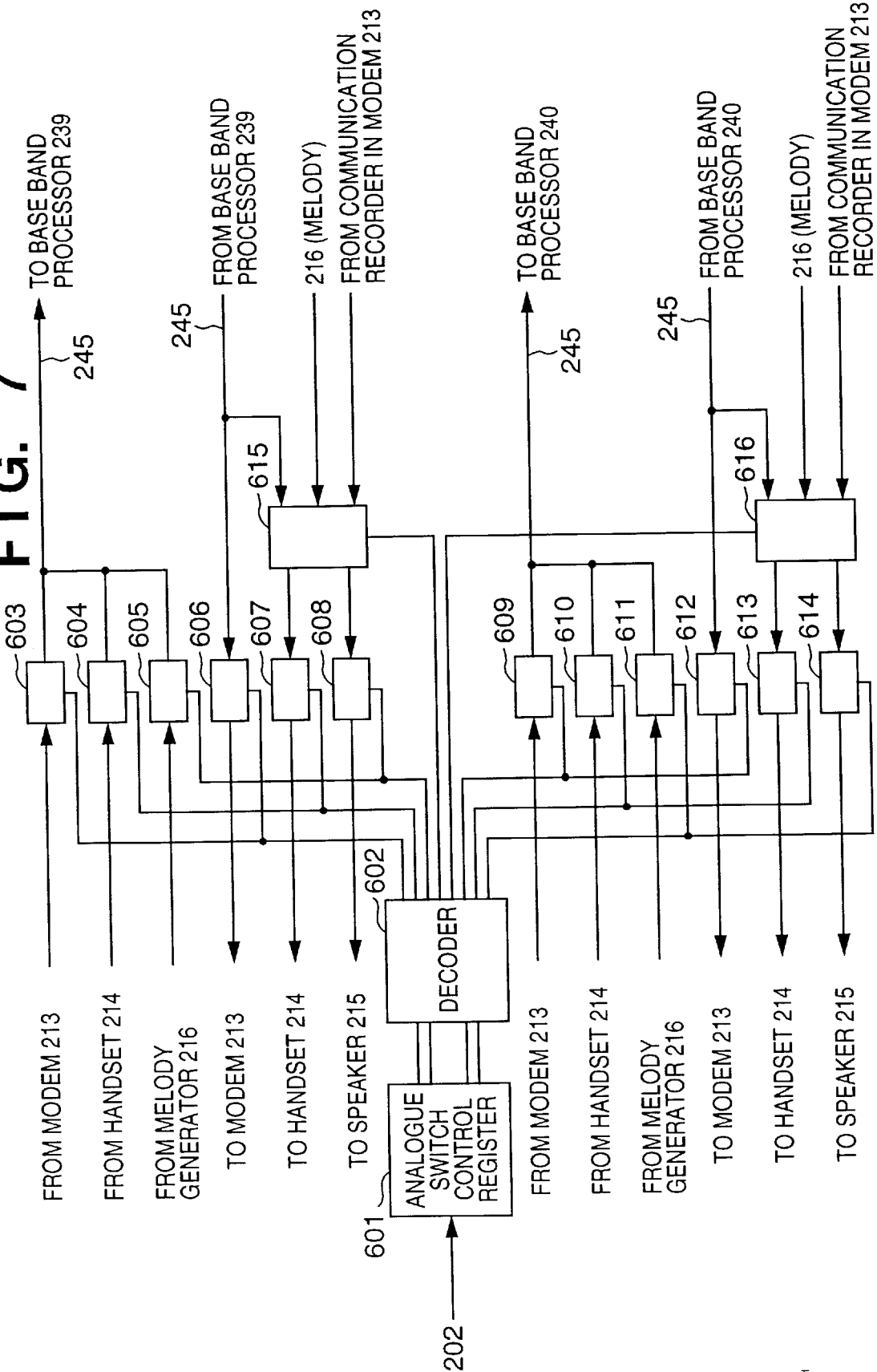

FIG. 8A

| R | SS | PR | UW | CI | OUTGOING ID | INCOMING ID | I (SCCH) | CRC |
|---|---|---|---|---|---|---|---|---|
| 4 | 2 | 62 | 32 | 4 | 42 | 28 | 34 | 16 |

FIG. 8B

| R | SS | PR | UW | CI | OUTGOING ID | I (SCCH) | CRC |
|---|---|---|---|---|---|---|---|
| 4 | 2 | 62 | 32 | 4 | 42 | 62 | 16 |

FIG. 8C

| R | SS | PR | UW | CI | SA | I (TCH, FACCH ETC.) | CRC |
|---|---|---|---|---|---|---|---|
| 4 | 2 | 6 | 16 | 4 | 16 | 160 | 16 |

FIG. 9A  NEGOTIATION FRAME

| FRAME IDENTIFICATION | SYNCHRONIZATION DATA, PROTOCOL DATA, ETC. | FCS |
|---|---|---|

FIG. 9B  SYNCHRONIZATION FRAME

| FRAME IDENTIFICATION | SYNCHRONIZATION DATA ETC. | FCS |
|---|---|---|

FIG. 9C  CONTROL FRAME

| FRAME IDENTIFICATION | CONTROL DATA | FCS |
|---|---|---|

FIG. 9D  DATA FRAME

| FRAME IDENTIFICATION | ARQ CONTROL | DATA | FCS |
|---|---|---|---|

FIG. 10

| FLAG | ADDRESS | CONTROL | PROTOCOL | DATA | FCS | FLAG |
|---|---|---|---|---|---|---|

RADIO COMMUNICATION APPARATUS, HAVING COMBINED FUNCTIONS SUCH AS TERMINAL ADAPTER, DIGITAL RADIO COMMUNICATION APPARATUS, FACSIMILE COMMUNICATION APPARATUS AND SO ON, FOR BEING CONNECTED TO A DIGITAL PUBLIC COMMUNICATION LINE

BACKGROUND OF THE INVENTION

The present invention relates to a radio communication apparatus, having combined functions as a terminal adapter, a digital radio communication apparatus, a facsimile communication apparatus and so on, for being connected to a digital public communication line.

Lately, as the ISDN (Integrated Services Digital Network) is widely adopted, a data terminal such as a personal computer or the like is connected to ISDN via a terminal adapter for data communication.

In this case, the data terminal (hereinafter referred to as PC) is connected to the terminal adapter by a cable, e.g., RS232C, and transmits data to the terminal adapter according to an asynchronous scheme at the transmission speed of, e.g., 2400 bps, 4800 bps, 9600 bps, 19.2 Kbps, 38.4 Kbps and so forth. The terminal adapter converts the transmission speed of the received data to 64 Kbps according to the CCITT (International Telegraph and Telephone Consultative Committee) Standard Recommendation V. 110, I. 460, and transmits the converted data to ISDN.

Since the terminal adapter is connected to ISDN which serves as a public communication network, other media such as the telephone, facsimile and the like which are used to communicate audio data or image data, are generally connected to an analogue port of the terminal adapter.

FIG. 17 is a block diagram showing a system construction using a conventional terminal adapter.

Referring to FIG. 17, reference numeral 2101 denotes a terminal adapter; 2102, a PHS (Personal Handyphone System) master unit connected to a first analogue port of the terminal adapter; 2103, a PHS slave unit; 2104, a personal computer (PC) connected to the terminal adapter by RS232C cable; 2105, a scanner connected to the PC by a cable; 2106, a printer connected to the PC by a cable; 2107, a facsimile apparatus connected to the second analogue port of the terminal adapter; and 2108, ISDN.

FIG. 18 is a block diagram showing an internal structure of the conventional terminal adapter.

Referring to FIG. 18, reference numeral 2201 denotes a CPU (microcomputer); 2202, a memory; 2203, a data bus; 2204, an ISDN interface unit including DSU (Digital Service Unit); 2205, a B-channel serial signal; 2206, an HDLC (High-level Data Link Controller) which assembles/disassembles data frames transmitted through ISDN; 2207, an RS232C interface unit; and 2208, an analogue port to which a terminal connectable to an analogue public communication line is connected.

FIGS. 19 and 20 show communication sequences when data is transmitted/received via a conventional terminal adapter.

Steps of performing data communication using a conventional terminal adapter are now described.

First, when data communication is performed by using PC 2104, a communication command (e.g. AT command transmitted between a communication unit and a data terminal) outputted by the PC 2104, is received by the serial communication interface unit 2207. The serial communication interface unit 2207 outputs an interruption request to the CPU 2201, and in the interruption processing executed in response to the interruption request, the serial communication interface unit 2207 notifies the CPU 2201 that the data has been received. The CPU 2201 transfers the received data transmitted by the PC 2104 via the serial communication interface 2207 to the memory 2202. When the CPU 2201 analyzes the AT command sent by the PC 2104 and recognizes that the transmission is addressed to ISDN, the CPU 2201 starts-up the ISDN interface unit 2204 to perform transmission processing. Upon receiving a response message from ISDN, the AT command is transmitted to the PC 2104 via the serial communication interface unit 2207, and notifies the PC 2104 that the called party has responded.

Then, the PC 2104 starts data transmission through the terminal adapter. The data subjected to transmission is stored in the memory 2202 similar to the AT command. Next, the CPU 2201 writes the data stored in the memory into the HDLC controller 2206. The data is assembled into an HDLC frame format by the HDLC controller 2206, and is transmitted by the CPU 2201 to ISDN.

Conversely, data reception from ISDN is detected by the HDLC controller 2206 and stored in the memory 2202. The CPU 2201 writes the stored data into the serial communication controller 2207 and outputs it to the PC 2104 through the RS232C cable.

Meanwhile, the PHS master unit 2102, facsimile apparatus 2107 and the like can be connected to the analogue port of the terminal adapter 2101. If the PHS master unit 2102, which has received a transmission request from the PHS slave unit 2103, performs transmission processing (inversion), the CPU 2201 detects the transmission request via the analogue port 2208 of the terminal adapter 2101, and performs transmission processing to ISDN. Accordingly, communication using PHS is realized. The same description applies to a facsimile apparatus.

However, the above-described terminal adapter is connected to a PC only by a cable, e.g., the RS232C cable. Therefore, the PC must be placed near the terminal adapter. If the PC is set far from the connection portion of the public communication line, a long cable is necessary, requiring wiring works.

Further, since the public communication line is shared by the telephone unit, facsimile apparatus and terminal adapter and further the PC is connected to the terminal adapter, printer and scanner, line connections are complicated and require a large set-up area.

Furthermore, in the conventional system, each of the resources (devices), e.g., the PHS system connected to the terminal adapter 2101, scanner 2105 connected to the PC 2104, printer 2106, facsimile apparatus 2107 and so on, cannot efficiently be used in the entire system, result being wasteful, where similar functions are separately provided by plural devices.

SUMMARY OF THE INVENTION

The present invention is made in consideration of the above situation, and has as its object to improve a radio communication apparatus.

Another object of the present invention is to provide a communication system where a PC can be connected to a public communication line, even in a case where the PC is not connected to a terminal adapter by a cable, by utilizing the digital radio communication technology which is widely used recently.

Moreover, another object of the present invention is to provide a terminal adapter including functions for a printer, scanner, facsimile and telephone to be controlled integrally, so as to improve operability, save space and reduce cost.

Furthermore, another object of the present invention is to adopt a structure using multiple CPUs and a shared register, which enable to add the functions of terminal adapter and PHS master unit to the conventional facsimile apparatus without requiring large changes, so as to realize a highly-expandable radio communication apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 6 is a diagram showing a detailed configuration of a port switch 233;

FIG. 7 is a block diagram showing a detailed configuration of an analogue switch 217;

FIGS. 8A to 8C are diagrams showing frame formats for PHS radio transmission;

FIGS. 9A–9D are diagrams showing frame formats used in radio-data-transmission protocol (PIAFS);

FIG. 10 is a diagram showing a frame format according to PPP (Point to Point Protocol);

DETAILED DESCRIPTION OF THE PREFERRED EMBODIMENTS

Preferred embodiments of the present invention will be described in detail in accordance with the accompanying drawings.

First Embodiment

Figure 1:
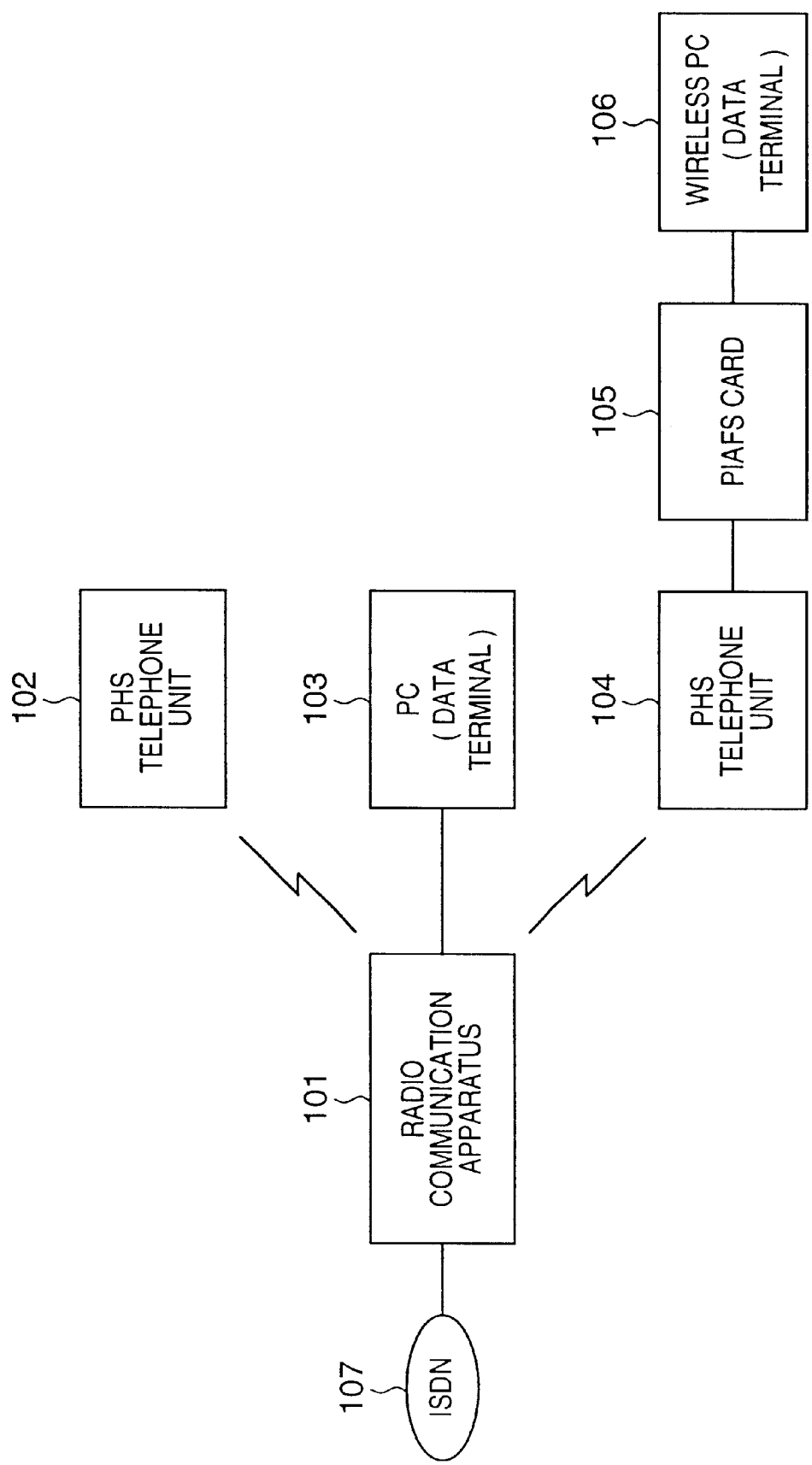
FIG. 1 is a block diagram showing a system construction according to a first embodiment of the present invention.

FIG. 1 is a block diagram showing a system construction according to the first embodiment of the present invention.

Referring to FIG. 1, reference numeral 101 denotes a radio communication apparatus; 102, a PHS telephone unit; 103, a PC connected by a cable; 104, a PHS telephone unit; 105, a radio-data-transmission protocol processing card (hereinafter referred to as PIAFS card); 106, a wireless PC; and 107, a digital public communication network (hereinafter referred to as ISDN).

Figure 2:
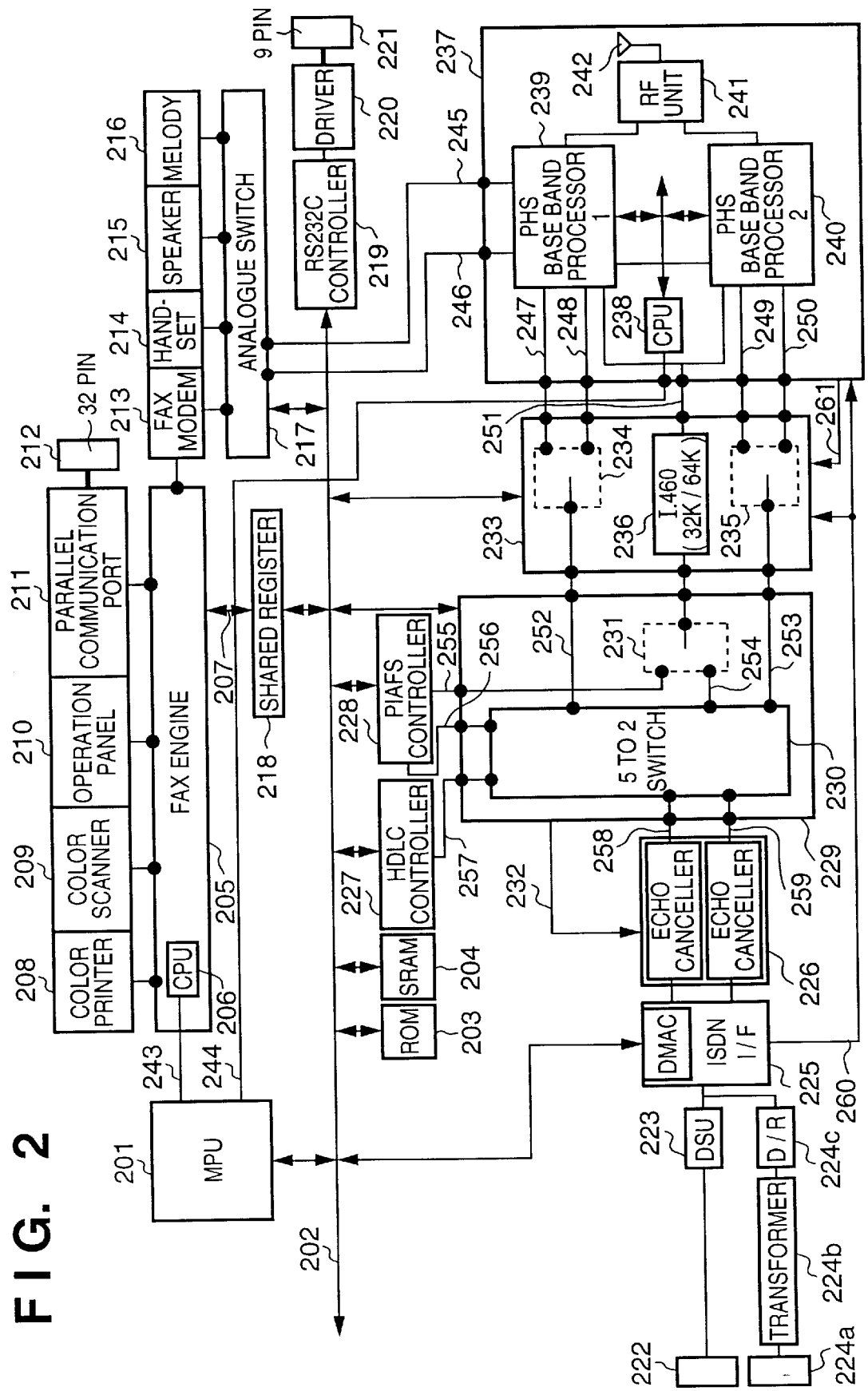
FIG. 2 is a block diagram showing the construction of the radio communication apparatus 101.

FIG. 2 is a block diagram showing the construction of the radio communication apparatus 101.

Referring to FIG. 2, reference numeral 201 denotes a central controller (MPU); 202, data bus and address bus; 203, a ROM; and 204, a RAM.

Reference numeral 205 denotes a facsimile (FAX) engine unit including a CPU (microcomputer), image processing portion and so on; 206, a FAX engine CPU; and 207, a data bus for the FAX engine unit. The FAX engine 206 is connected to devices (208 to 216), required for facsimile transmission operation, and controls thereof. Reference numeral 208 denotes a color printer; 209, a color scanner; 210, an operation panel; 211, a parallel communication interface port; 212, a parallel communication interface connector. Data transmitted by the PC via the parallel communication interface connector can be printed by the printer 208, or an image read by the scanner 209 can be transmitted to the PC via the parallel communication interface connector 212. Reference numeral 213 denotes a FAX modem; 214, a handset; 215, a speaker; and 216, a holding melody generator. The FAX modem 213, handset 214, speaker 215 and melody generator 216 are controlled by the FAX engine unit 205 and connected to an analogue switch 217. Audio data or analogue data for facsimile transmission is sent to the public communication line via the analogue switch 217.

Reference numeral 218 denotes a shared register, used when data is exchanged between a device connected to the data bus of the FAX engine unit and a device connected to the data bus of the MPU 201.

Reference numeral 219 denotes a serial communication controller; 220, an RS232C driver/receiver; and 221, an RS232C connector. The controller 219, driver/receiver 220 and connector 221 are connected to the communication port of the PC, and serve as an interface for data transmission/reception between the PC and public communication line.

Reference numeral 222 denotes a modular connector for being connected to ISDN (U point); and 223, a DSU (Digital Service Unit) for converting the data exchanged with a base station switchboard, to signals of TTL (Transistor-Transistor logic) level. Reference numeral 224a denotes a modular connector for connecting the terminal and bus to ISDN (S/T point); 224b, a transformer; and 224c, a driver/receiver. These portions enable use of plural ISDN terminals connected via bus, by performing conversion processing on AMI code data and TTL-level signals which are exchanged with an ISDN terminal connected to the S/T point. Reference numeral 225 denotes an ISDN interface unit which controls ISDN layers 1 to 3 and has functions to interface data input/output at the channel B of ISDN.

Reference numeral 226 denotes an echo canceller, which cancels echo generated in the public communication line. Reference numeral 227 denotes an HDLC controller for assembling/disassembling the data in HDLC format.

Reference numeral 228 denotes a PIAFS controller for assembling/disassembling the data in radio-data-transmission protocol (PIAFS) format.

Reference numeral 229 denotes a first port switch having a 5-to-2 switch 230 and a 2-to-1 switch 231. The MPU 201 controls the switching processing of data transmitted at the channel B1 and channel B2 of ISDN. Reference numeral 232 denotes an echo canceller control signal for setting an operation mode of the echo canceller or controlling the ON/OFF of the echo canceller operation.

Reference numeral 233 denotes a second port switch including 2-to-1 switches 234 and 235. The MPU 201 controls the switching processing of a data line connected to the first port switch 229. Reference numeral 236 denotes an I.460 data conversion processor for performing transmission speed conversion processing of 32 Kbps/64 Kbps.

Reference numeral 237 denotes a PHS engine unit; 238, a CPU for controlling the PHS; 239 and 240, a PHS baseband processor including an audio CODEC portion, a radio transmission frame assembling/disassembling portion and a modulator/demodulator. Reference numeral 241 denotes a radio-frequency (RF) unit; 242, an antenna which enables to convert analogue audio data or facsimile data inputted/outputted through the analogue switch 217 into PCM data, and perform wireless audio data transmission or data transmission with a PHS telephone unit at 32 Kbps using two channels.

Hereinafter, functions of important signal lines are described. Reference numeral 243 denotes a signal line for serial communication signals used for inter-CPU communications between the MPU 101 and CPU 206 of the FAX engine unit. Reference numeral 244 denotes a signal line for serial communication signals used for inter-CPU communications between the MPU 201 and CPU 238 of the PHS engine unit.

Reference numerals 245 and 246 denote signal lines for analogue signals, connecting the analogue switch 217 and PHS engine unit 237. The analogue signals in the signal lines are converted to PCM signals respectively by the PCM CODEC of the PHS baseband processors 239 and 240.

Reference numeral 247 denotes a signal line for data communication through which analogue signals from the analogue signal line 245 is PCM-converted and transmitted at 64 Kbps. Reference numeral 248 denotes a signal line for data communication at 64 Kbps using the first wireless slot. Reference numeral 249 denotes a signal line for data communication in which analogue signals from the analogue signal line 246 is PCM-converted and transmitted at 64 Kbps. Reference numeral 250 denotes a signal line for data communication at 64 Kbps using the second wireless slot.

Reference numeral 251 denotes a signal line for data transmitted at 32 Kbps in unlimited digital communication, and is connected to the port switch 229 via the I.460 conversion processor 236 in order to be connected to the channel B of ISDN.

Reference numeral 252 denotes a signal line for PCM audio data, connected to the baseband processor 239; 253, a signal line for PCM audio data, connected to the baseband processor 240; 254 and 255, signal lines for unlimited digital data, connected to the I.460 processor 236, each of the signal lines being connected to the switch 231 and PIAFS controller 228 respectively. Reference numeral 256 denotes a signal line for data transmitted at 64 Kbps, connected to the PIAFS controller; and 257, a signal line for data transmitted at 64 Kbps, connected to the HDLC controller. Reference numeral 258 denotes a signal line for data transmitted at 64 Kbps at the channel B1 of ISDN; and 259, a signal line for data transmitted at 64 Kbps at the channel B2 of ISDN.

Reference numeral 260 denotes a signal line for supplying clock signals having 8 KHz and 64 KHz extracted from ISDN. Signal transfer on the data lines 258 and 259 is executed in synchronization with these clock signals. Reference numeral 261 denotes a signal line for supplying clock signals having 8 KHz, 32 KHz and 64 KHz outputted from the PHS engine unit. Signals on the data lines 247, 248, 249 and 250 are transferred in synchronization with the clock signals having 8 KHz or 64 KHz, and signals on the data line 251 are transferred in synchronization with the clock signals having 8 KHz or 32 KHz.

Figure 3:
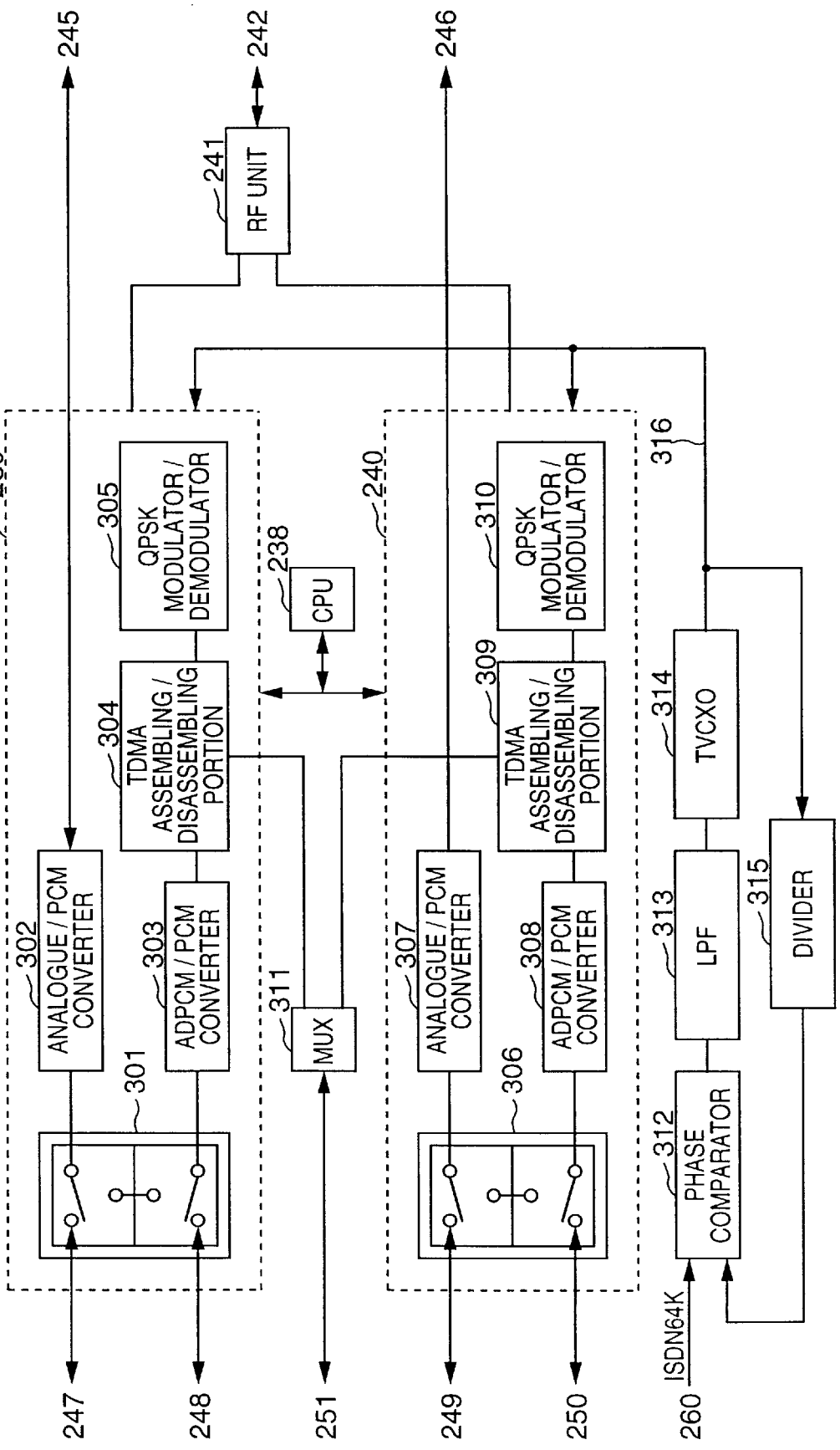
FIG. 3 is a block diagram showing in detail a construction of the PHS engine unit.

FIG. 3 is a block diagram showing in detail a construction of the PHS engine unit 237.

Referring to FIG. 3, reference numerals 301 and 306 are switches for performing connection among a signal line connected to the analogue switch 217, a signal line connected to ISDN and a signal line for radio communication. Reference numeral 302 and 307 denote analogue/PCM converters; 303 and 308, ADPCM/PCM converters; 304 and 309, time-division-multiple-access (TDMA) assembling/disassembling portion for assembling/disassembling radio transmission frames shown in FIG. 7; and 305 and 310, π/4 shift QPSK modulator/demodulator. Reference numeral 311 denotes a multiplexer for selecting a baseband processor to be used in radio data communication. Note that as will be described later in the second embodiment, the multiplexer is not necessary when radio data communication is performed in two channels.

In the baseband processors 239 and 240, switches 301 and 306 are switched by the control of CPU 238 in order to switch the data transmission path in various ways according to the situation. For instance, when communication is to be performed using a handset via the ISDN line, an analogue signal 245 outputted by the analogue switch 217 is converted to PCM codes by the analogue/PCM converter 302 and outputted to the data line 247. Meanwhile, when communication is performed between the handset and wireless telephone unit, audio data converted to PCM codes is converted to ADPCM codes by the ADPCM/PCM converter, assembled into a wireless frame, then modulated, and transmitted to a wireless line. Further, in a case where the audio data from the wireless telephone unit is sent to ISDN, the data line 247 is connected to the ADPCM/PCM converter 303.

Reference numeral 312 denotes a phase comparator which outputs a pulse having a width corresponding to a phase difference. Reference numeral 313 denotes a low pass filter; 314, a temperature compensating voltage control oscillator (TVCXO); and 315, a divider. These portions enable to generate 19.2 MHz clock signal 316, having precision of ±5 ppm, which is synchronous with a 64 KHz clock signal extracted from ISDN. The baseband processors 239 and 240 operate with the generated 19.2 MHz clock signal as a reference.

When data (including audio data converted to PCM codes) is transmitted/received between the PHS and ISDN, the ISDN line and PHS wireless line must operate in synchronization to prevent data overrun or underrun. On the other hand, the synchronization timing in the PHS wireless line requires high precision, i.e., within ±5 ppm. Since synchronization timing clock extracted from ISDN is not as precise as ±5 ppm, there is a necessity that a PLL (Phase-Locked Loop), constituted with the comparator 312 to divider 315, generates a 19.2 MHz clock signal, i.e., multiplication of the 64 KHz clock signal 260 synchronizing with ISDN, to operate the baseband processors 239 and 240.

An output frequency of the TVCXO 314 is within 19.2 MHz ±5 ppm regardless of an input voltage. A 64 KHz clock signal, into which the output clock is divided, and a 64 KHz clock signal synchronizing with ISDN are inputted to the phase comparator 312. In accordance with the result of the phase comparator, if the phase of ISDN clock signal is leading, a 5V-pulse is outputted, while if the phase is lagging, a 0V-pulse is outputted, and a signal smoothed by the low pass filter 313 controls the TVCXO 314. Therefore, when the phase of ISDN clock signal is leading, the control voltage of the TVCXO is increased and the output frequency of the TVCXO 314 rises; and as a result, the phase of the TVCXO output and the phase of the ISDN clock signal moves closer to coincident. Conversely, when the phase of the ISDN clock signal is lagging, the control voltage of the TVCXO is decreased and the output frequency of the TVCXO 314 declines; and as a result, the phase of the TVCXO output and the phase of the ISDN clock signal moves closer to coincident.

Figure 4:
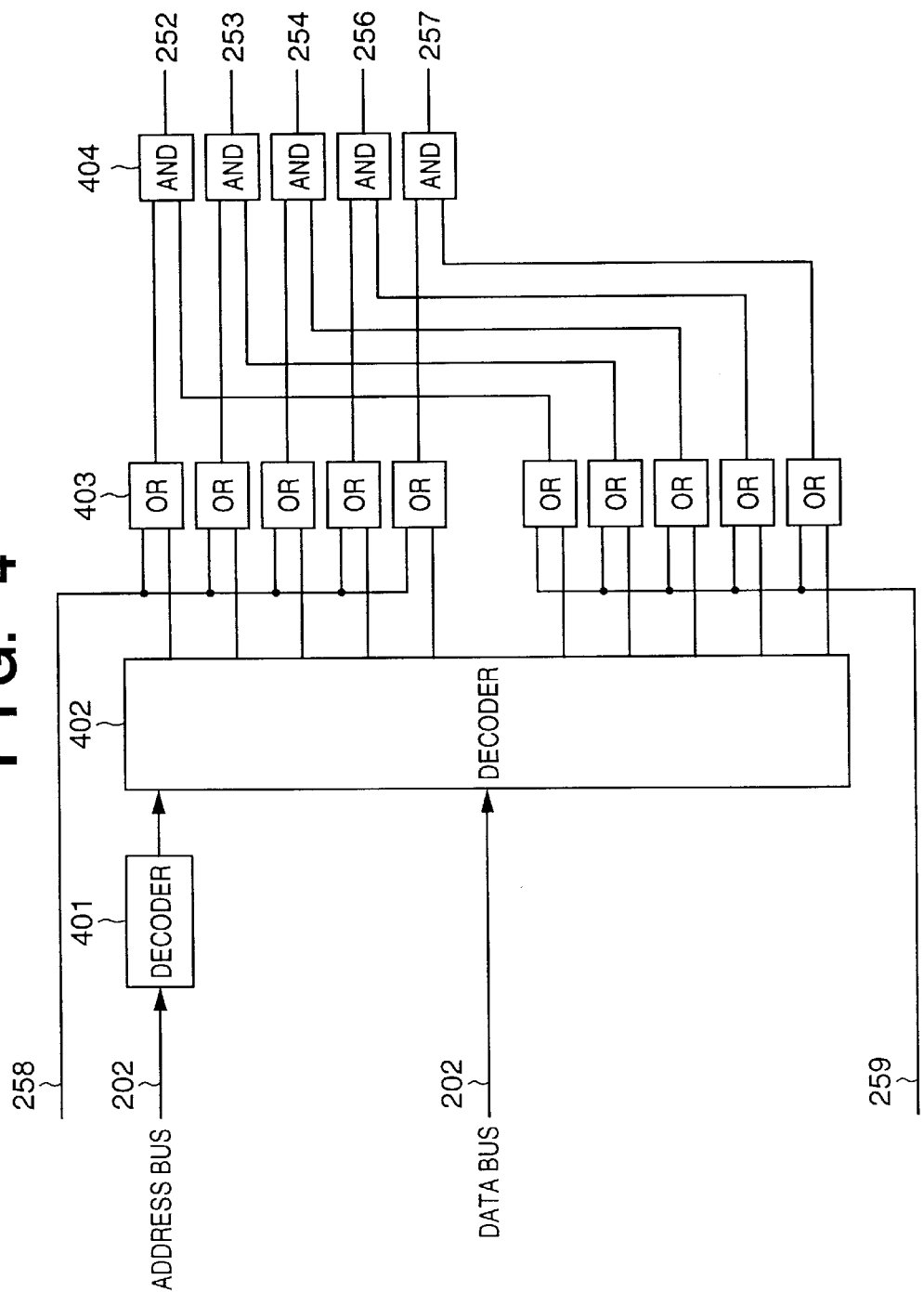
FIG. 4 is a diagram showing a detailed configuration of a switch 230.
Figure 5:
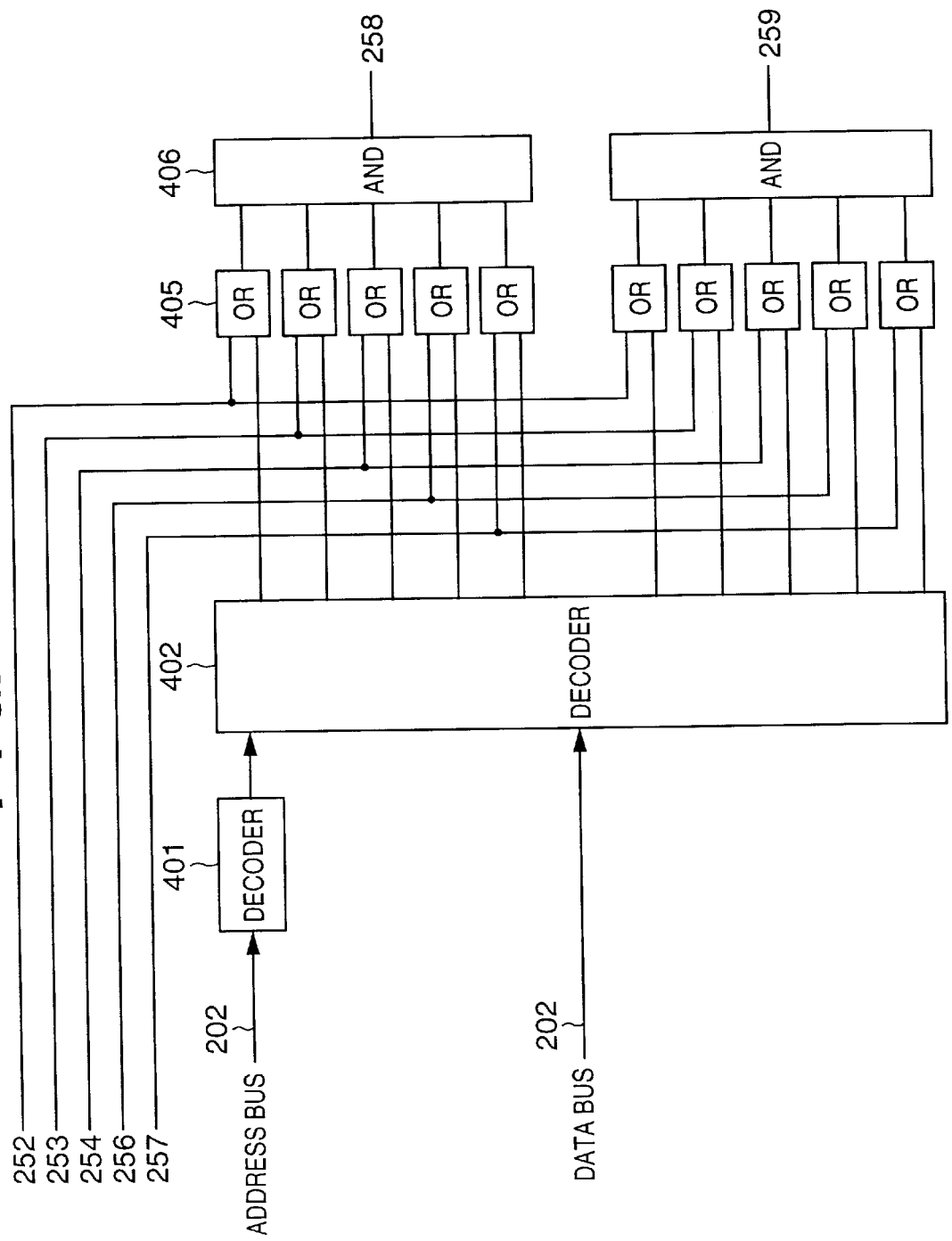
FIG. 5 is a diagram showing a detailed configuration of the switch 230.

FIGS. 4 and 5 are logic diagrams showing detailed configuration of the switch 230.

Referring to FIGS. 4 and 5, reference numerals 401 and 402 denote a decoder; 403 and 405, OR gates; and 404 and 406, AND gates.

FIG. 4 shows a logic diagram for connecting the data line, connected to the channel B1 and channel B2 of the ISDN, with one of the HDLC controller 227, PIAFS controller 228, or the three signal lines connected to the PHS engine unit. When the MPU 201 writes a predetermined value in the address allocated to the switch, the decoder 402 decodes the value and outputs L (0V) only to the OR gate 403 connected to the targeted destination among those destinations (252, 253, 254, 256, 257) connectable to the data lines 258 or 259, while outputs H (5V) to other OR gates. Therefore, the AND gate 404 receives data from the data lines 258 and 259 only from the selected OR gate; as a result, the data lines 258 and 259 are respectively connected to one line of the five output data lines.

FIG. 5 is a logic diagram for connecting one of the HDLC controller 227, PIAFS controller 228, or the three signal lines connected to the PHS engine, with a transmission data line for channel B1 or B2 of the ISDN. When the MPU 201 writes a predetermined value in the address allocated to the switch, the decoder 402 outputs L (0V) only to the OR gate 405, whose signal lines are connected to the data lines 258 and 259, among the data lines 252, 253, 254, 256 and 257. Accordingly, one of the five signal lines is connected to the data line 258, and the other line is connected to the data line 259.

FIG. 6 is a logic diagram showing detailed configuration of the port switch 233.

Referring to FIG. 6, reference numeral 501 denotes a decoder for generating signals for controlling the selection circuits 505 and 509; and 502, a serial/parallel converter for converting serial data transmitted by the port switch 229 into parallel data. The serial/parallel converter performs parallel conversion operation in synchronization with the 8 KHz and 64 KHz clock signals extracted from the ISDN. Reference numeral 503 denotes a FIFO buffer for buffering data on which serial/parallel conversion has been performed. Reference numeral 504 denotes a parallel/serial converter for converting the parallel signal, outputted by the FIFO buffer, into serial data. The parallel/serial converter performs the conversion operation in synchronization with the 8 KHz or 64 KHz clock signals supplied by the PHS engine unit 237. The FIFO buffer 503 serves to prevent data error due to a phase difference between the clock of the ISDN side and clock of the PHS side. More specifically, even if the data-latch timing of the parallel/serial converter 504 coincides with the timing at which output data of the serial/parallel converter 502 changes, the FIFO buffer 503 buffers data for two bytes in order to prevent data error.

Reference numeral 505 denotes a selection circuit for selecting whether serial data is to be converted to an analogue signal or to be outputted by radio. The selection circuit 505 is controlled by the MPU 201 via the decoder 501. An output from the selection circuit 505 is inputted to the PHS engine unit 237.

Conversely, data from the PHS engine unit 237 is outputted to the port switch 229 via the multiplexer 509, serial/parallel converter 508, FIFO buffer 507 and parallel/serial converter 506.

Reference numerals 510–515 basically perform the same operation as the numerals 502–504 and 506–508. Note that the parallel/serial converter 512 and serial/parallel converter 515 operate at 8 KHz and 32 KHz clock timing respectively, for performing speed conversion between 32 Kbps and 64 Kbps.

FIG. 7 is a block diagram showing a detailed configuration of the analogue switch 217.

Referring to FIG. 7, reference numeral 601 denotes a register for controlling an analogue switch, in which the MPU 201 writes data via data bus.

Reference numeral 602 denotes a decoder for converting data written in the register 601 and generating signals for controlling the analogue switches 603–614 and port switches 615 and 616.

Reference numerals 603–614 denote analogue switch devices, constituted by an input pin, an output pin and a control pin. When the control pin is at low level, the input pin and output pin are connected; while when the control pin is at high level, the input pin and output pin are disconnected.

Reference numeral 616 denotes a port switch for controlling whether to connect the baseband processors 239 and 240, melody sound source 216 and recorded communication output unit 213 to be connected to the handset or to the speaker.

The analogue switch selects the data to be transmitted to the baseband processors 239 and 240, from the output signal of the modem 213, audio signal inputted from the handset 214 or melody sound source 216, based on the control of MPU 201. More specifically, when FAX communication is performed, the modem 213 is connected; when communication is performed via the handset, the handset 214 is connected; and when the line is on hold, the melody sound source 216 is connected.

Conversely, during FAX communication, data outputted by the baseband processors 239 and 240 is inputted to the modem 213. During the communication, it is possible to output audio signals, outputted by the baseband processors, to the handset or speaker, by switching the port switches 615 and 616. During hold, a signal outputted by the holding melody generator 216 is outputted to the handset 214 or speaker 215. To listen to audio data recorded in a communication recording portion of the modem 212, a signal outputted by the modem 212 is sent to the handset 214 or speaker 215.

As described above, in accordance with the operation mode, plural kinds of analogue signals are switched and inputted to the baseband processors, and communication is realized via the ISDN line or by radio.

FIGS. 8A to 8C are diagrams showing frame formats for PHS radio transmission. FIG. 8A shows an SCCH (Signalling Control Channel) frame used when wireless link is established; FIG. 8B, a PCH (Paging Channel) frame; and FIG. 8C, a frame, such as TCH or FACCH, used for normal data communication.

FIGS. 9A–9D are diagrams showing frame formats used in radio-data-transmission protocol (PIAFS). FIG. 9A shows a negotiation frame transmitted/received to select a protocol and establish frame synchronization; FIG. 9B, a synchronization frame transmitted/received to establish frame re-synchronization during communication; FIG. 9C, a control frame for transmitting/receiving control data; and FIG. 9D, a data frame for transmitting/receiving user data. In order to perform data communication according to PIAFS, first, the negotiation frame is used for in-band negotiation, frame synchronization is established, and the response delay time is clocked; next, communication parameters are set by the control frame; and finally, data communication using the data frame is started.

FIG. 10 is a diagram showing a frame format according to the PPP (Point to Point Protocol). In FIG. 10, the flag is a pattern 01111110 indicating the beginning and end of the frame; address is a fixed pattern 11111111; control is a fixed pattern 00000011; protocol is two-byte data indicating the type of protocol used in the network layer; data is variable-length transmission data including PPP control data, user data and the like; and FCS is data error detection codes.

Figure 11:
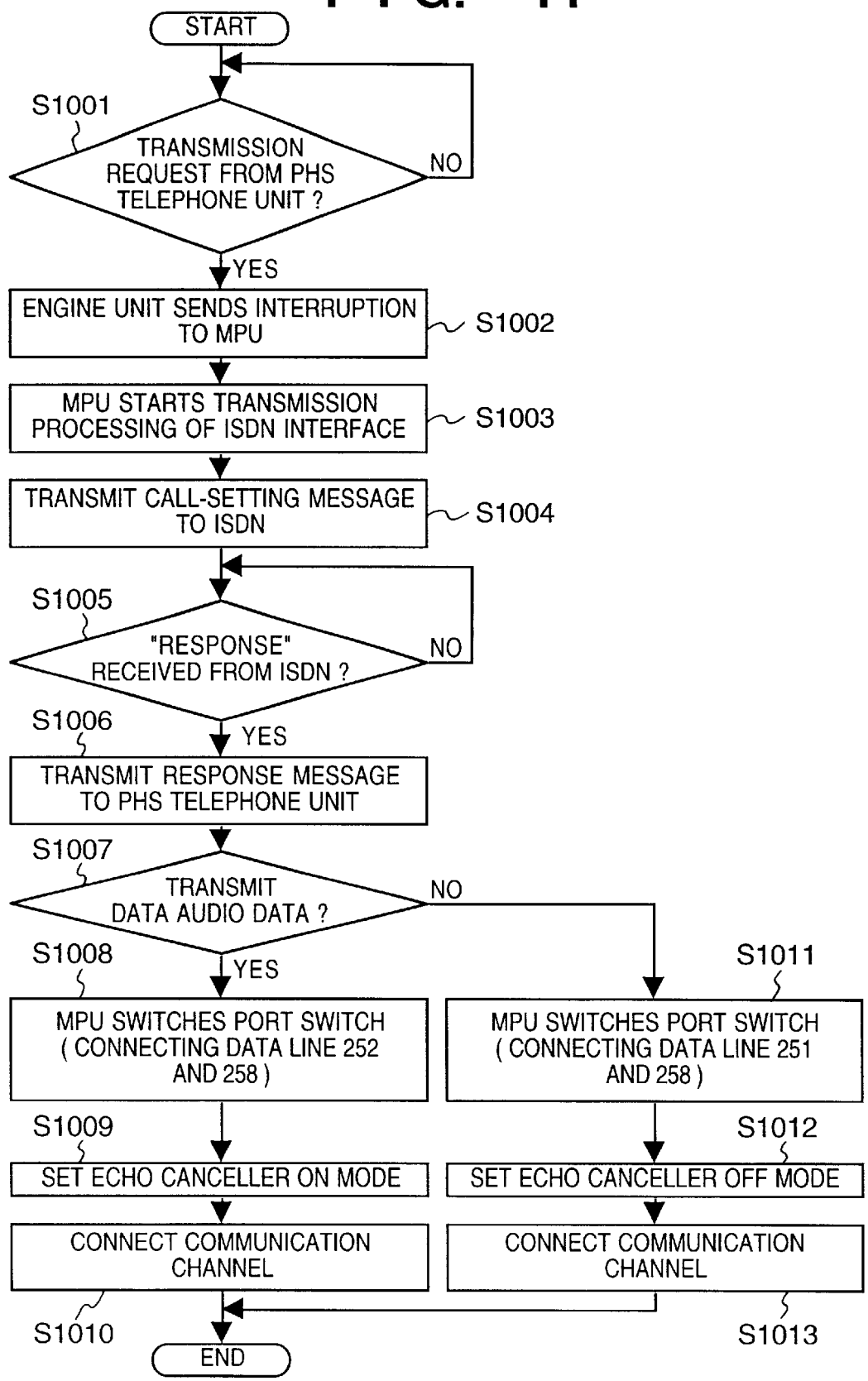
FIG. 11 is a flowchart describing audio data communication operation executed by a PHS telephone unit, and PIAFS communication operation executed by a wireless data terminal.

FIG. 11 is a flowchart describing audio data communication operation executed by a PHS telephone unit, and PIAFS communication operation executed by a wireless data terminal (PC).

Figure 12:
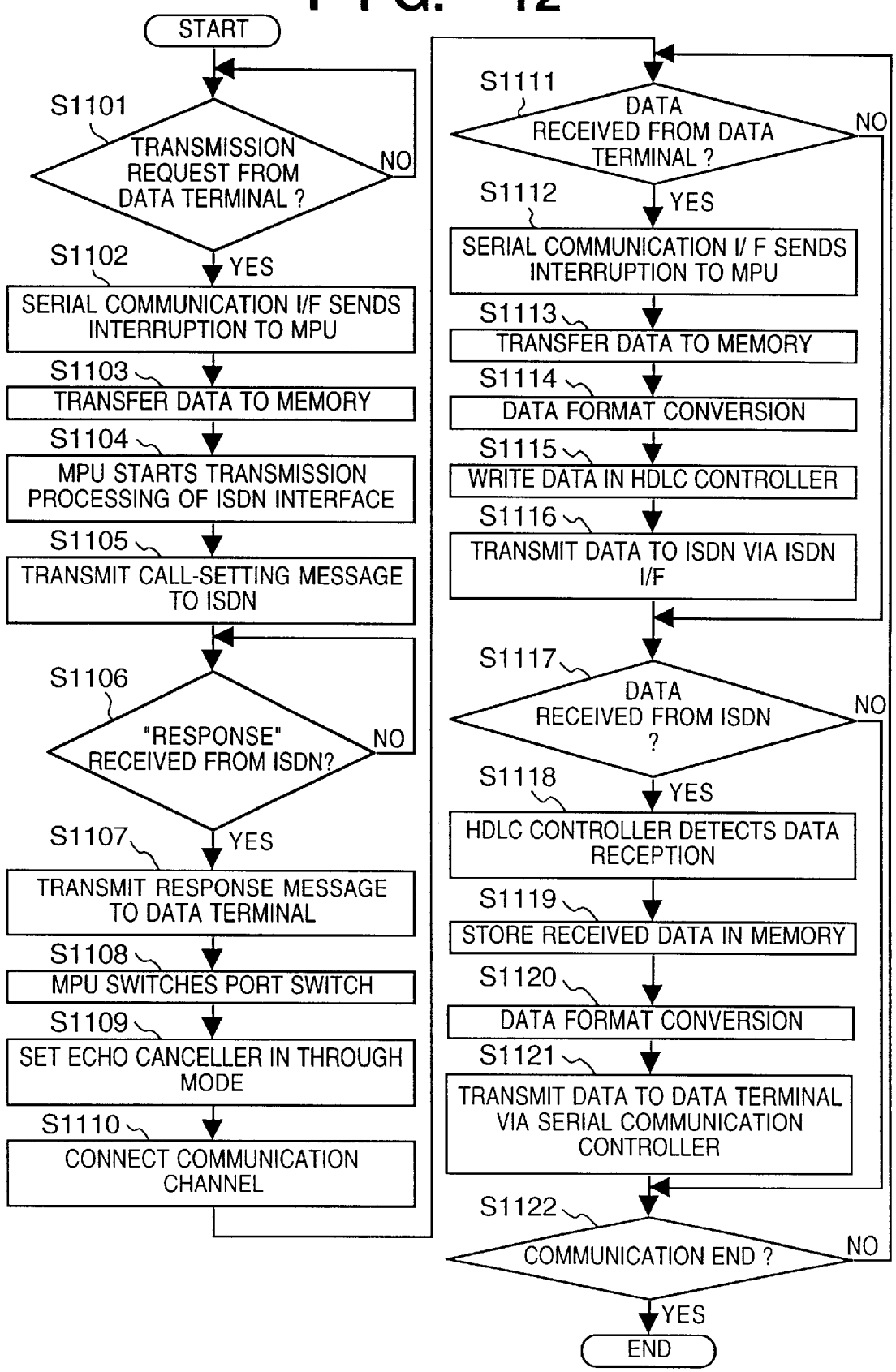
FIG. 12 is a flowchart describing data communication operation executed by a PC connected by a cable.

FIG. 12 is a flowchart describing data communication operation executed by a PC connected by a cable.

Figure 13:
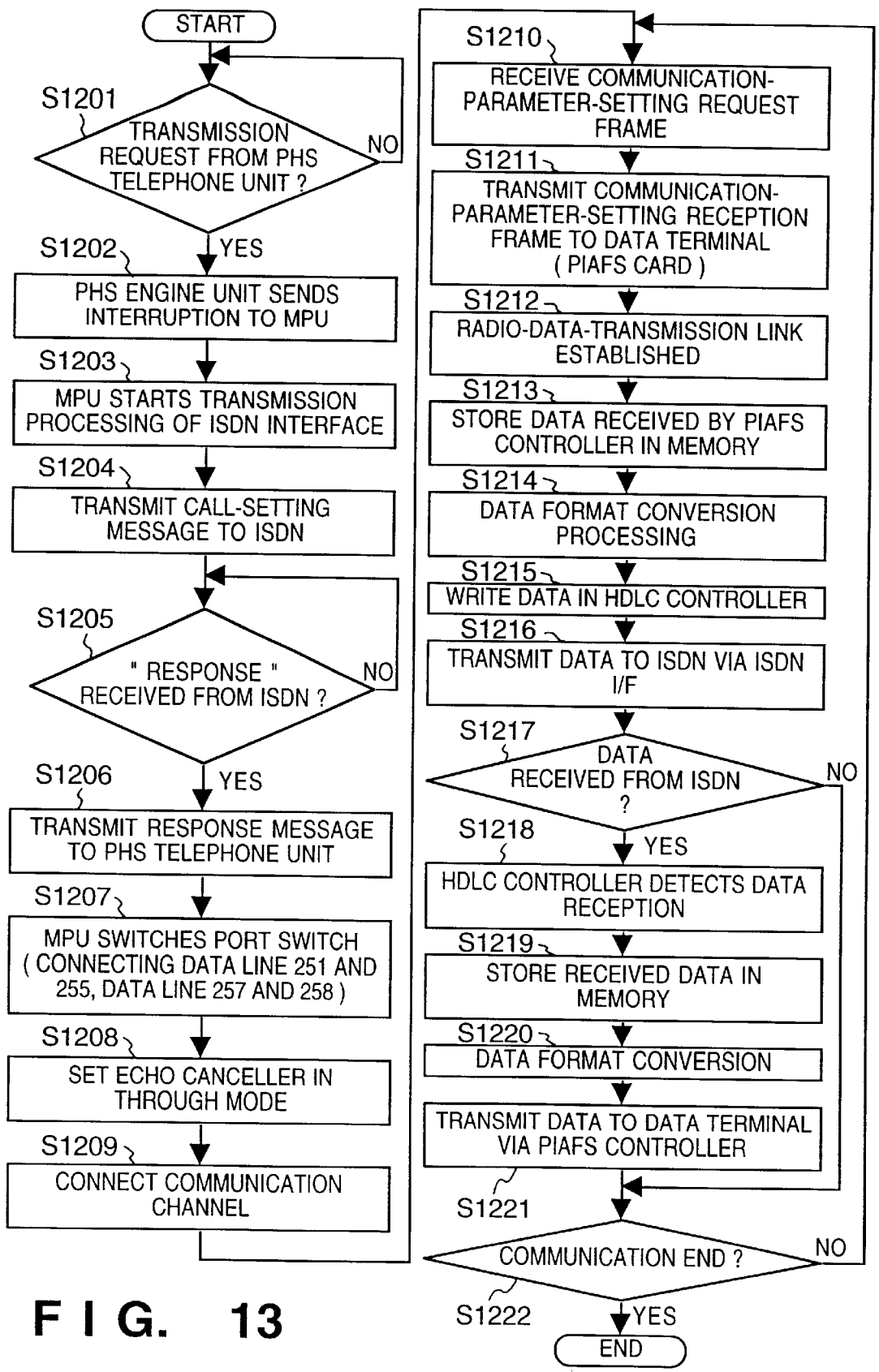
FIG. 13 is a flowchart describing synchronous PPP data communication operation executed by a wireless PC.

FIG. 13 is a flowchart describing synchronous PPP data communication operation executed by a wireless PC.

Programs for executing the processing shown in FIGS. 11, 12 and 13 are stored in a program memory having application programs of the data terminal, a ROM incorporated in the CPU 238 and the ROM 203, as a program executed by a computer (or a microcomputer) necessary for the respective processing.

Figure 14:
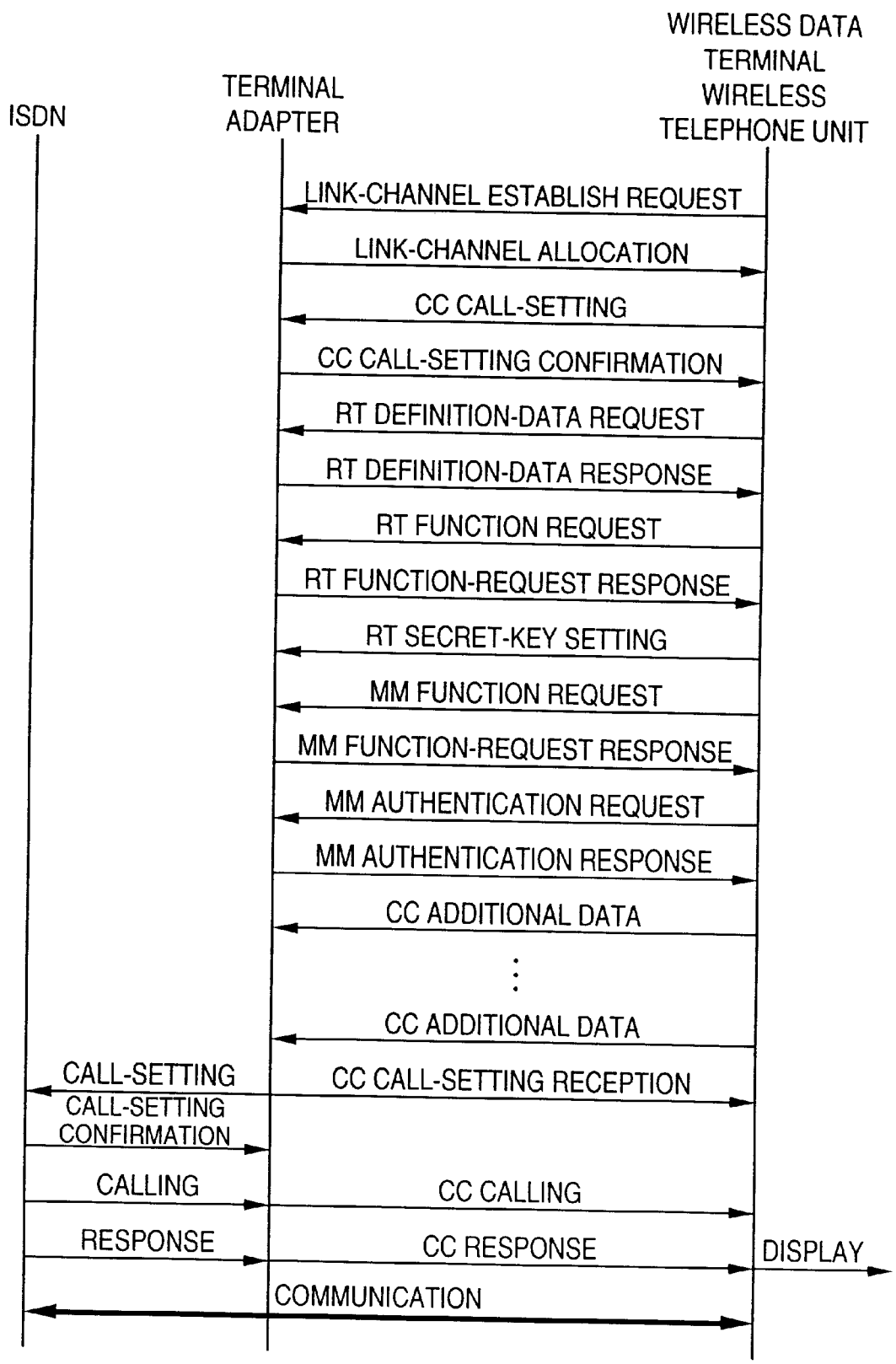
FIG. 14 is a flowchart describing a communication sequence at the time of data transmission in a radio communication apparatus including a wireless telephone unit and a wireless data terminal.
Figure 15:
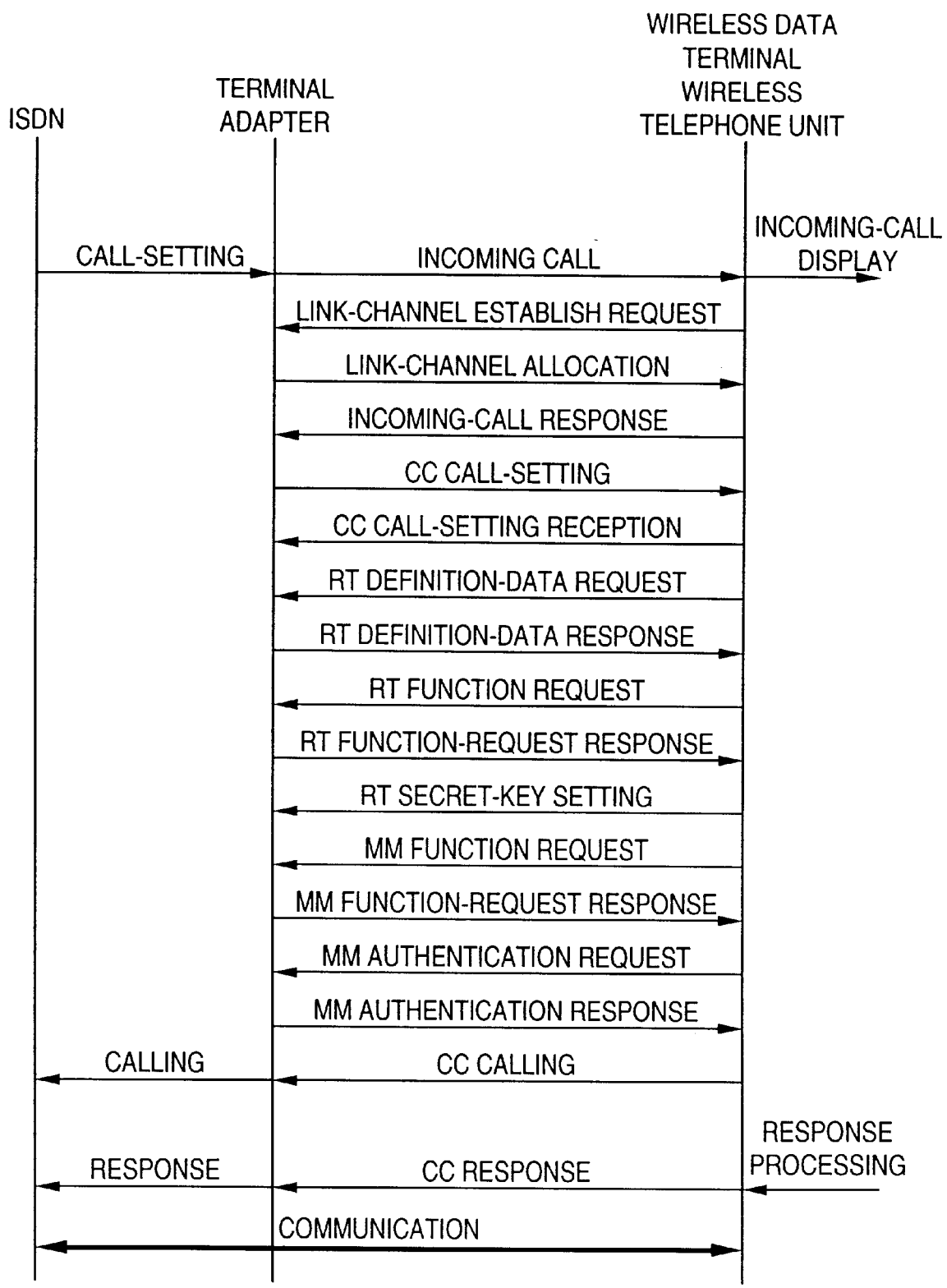
FIG. 15 is a flowchart describing a communication sequence at the time of data reception in a radio communication apparatus including a wireless telephone unit and a wireless data terminal.

FIGS. 14 and 15 are flowcharts showing communication sequences at the time of data transmission/reception in a radio communication apparatus including a wireless telephone unit and a wireless data terminal.

Next, description will be provided on operation processing (method) and data flow in various operation modes, which are executable by the radio communication apparatus according to the first embodiment.

1. Audio Data Communication Operation Executed by PHS Telephone Unit 102

Description is provided on the operation of the PHS telephone unit 102 when audio data communication is performed with a called party connected via ISDN. When dial operation is performed by key operation on the PHS telephone unit 102, outgoing-call processing is performed between the radio communication apparatus 101 and PHS telephone unit 102 according to the sequence shown in FIG. 14.

More specifically, the PHS telephone unit 102 first transmits a link-channel-establish request for a wireless link to the radio communication apparatus 101 using SCCH channel. In the radio communication apparatus 101, when the CPU 238 of the PHS engine unit 237 receives the wireless link-channel-establish request through the antenna 242, radio-frequency (RF) unit 241 and baseband processor 239 (S1001), a link-channel-allocation message is transmitted to the PHS telephone unit 102.

Upon receiving the link-channel-allocation message from the radio communication apparatus 101 via SCCH, the PHS telephone unit 102 transmits a call-setting message. The CPU 238 which has received the call-setting message transmits a call-setting-confirmation message to the PHS telephone unit 102. The PHS telephone unit 102, which has received the call-setting-confirmation message, exchanges messages related to radio control and motion control with the CPU 238, and transmits an additional data message. Upon receiving the additional data message, the CPU 238 notifies the MPU 201 through the serial communication port 244, that there has been an outgoing-call request to ISDN (S1002).

The MPU 201, which has received the outgoing-call request, starts transmission processing of the ISDN interface unit 225 (S1003). The ISDN interface unit 225 transfers, by direct memory access (DMA), a layer 3 message stored by the MPU 201 in the memory 204, and exchanges messages with the ISDN (S1004). Upon receiving a response message from the ISDN (S1005), the ISDN interface unit 225 outputs an interruption request to the MPU 201. When the MPU 201, which has received the interruption request, recognizes a response from the called party, the MPU 201 notifies the response to the CPU 238. Then, the CPU 238 transmits a response message to the PHS telephone unit 102 through the baseband processor 239 and the like (S1006). Accordingly, a communication channel is established between the PHS telephone unit 102 and radio communication apparatus 101.

At the same time, the MPU 201 switches the port switch so as to connect the communication channel of the PHS telephone unit 102 with the channel B of the ISDN. In the example herein, since the audio data transmitted/received at the PHS telephone unit 102 is transmitted/received by the baseband processor 239 and transferred to the data line 247, the switch 234 of the port switch 233 is controlled to connect the data line 247 with the data line 252. Further, the port switch 229 is switched so that the data line 252, to which switch 234 is connected, is connected to the data line 258 at the channel B1 of the ISDN (S1008).

When audio data communication is performed by the PHS telephone unit, line echo is generated due to the influence of delay caused by PHS frame assembling/disassembling processing. Thus, it is necessary to activate the echo canceller. The MPU 201 sets the port switch 229 to start echo cancel operation of the echo canceller 226 (S1009).

By the above processing, audio data inputted by the PHS telephone unit 102 is received by the PHS baseband processor 239, and the received PCM data is transmitted to the ISDN through the echo canceller 226, ISDN interface unit 225, DSU 223 and connector 222. Audio data received from the ISDN is transmitted to the PHS telephone unit 102 through the same path.

2. ISDN-Access Operation by PC 103

When the PC 103 performs data communication with a device connected to the ISDN, communication application software for the PC 103 is started, and the outgoing-call number is transmitted with AT command. In the radio communication apparatus, upon receiving the command (S1101), the data is inputted to the serial communication controller 219 via the RS232C connector 221. The serial communication controller 219, which has received the data, outputs an interruption request to the MPU 201 (S1102), and the MPU 201 transfers the data stored in the serial communication controller to the memory 204 (S1103).

The MPU 201, which has analyzed the received data, recognizes that the received data is an outgoing-call request, the MPU 201 starts transmission processing of the ISDN interface unit 225 (S1104). The ISDN interface unit 225 transfers, by direct memory access (DMA), a layer 3 message stored by the MPU 201 in the memory 204, and exchanges messages with the ISDN (S1105). Upon receiving a response message from the ISDN, the ISDN interface unit 225 outputs an interruption request to the MPU 201. When the MPU 201, which has received the interruption request, recognizes connection with the called party, the MPU 201 notifies the connection to the PC 103 via the serial communication controller 219 (S1107).

Further, the MPU 201 controls the port switch 229 to connect the data line 257 with the data line 258 (S1108). By this, data outputted by the HDLC controller 227 is transmitted to the ISDN through the echo canceller 226, ISDN interface unit 225, DSU 223 and connector 222. Herein, since echo cancel processing is not necessary in the data communication, the MPU 201 sets the echo canceller 226 in the through mode by using the port switch 229 (S1109). By the foregoing processing, the data communication channel is established, and data transmission/reception is enabled between the PC 103 and ISDN (S1110).

The PC 103, which has received the connection notification, starts the subsequent data transmission. Herein, the data to be transmitted has a frame configuration according to the asynchronous PPP (Point to Point Protocol) shown in FIG. 10.

The data transmitted by the PC 103 is stored in the memory 204 via the serial communication controller 219 as similar to the aforementioned AT command data. More specifically, upon receiving data (S1111), the serial communication controller 219 outputs an interruption request to the MPU 201 (S1112), and the MPU 201 transfers the data to the memory 204 (S1113). Since the stored data has a frame configuration according to the asynchronous PPP, there is a case where the data includes a pattern same as the flag pattern (01111110) of HDLC used for ISDN transmission.

To cope with this situation, the MPU 201 reads the stored data and performs PPP asynchronization-synchronization conversion processing so that the above flag pattern does not appear in the data (S1114). More specifically, when a bit array the same as the flag pattern appears, processing is performed to replace the flag pattern with the control escape (01111101)+data (01011110) reversing the sixth bit of the flag pattern.

Upon above processing, the MPU 201 transfers data other than the flag pattern to the HDLC controller 227 (S1115). The HDLC controller 227 transfers the data 255, which is in synchronous with the 64 KHz clock signal extracted from the ISDN, to the port switch 229, and the data is transmitted to the ISDN through the ISDN interface unit 225 (S1116).

Conversely, when data is received from the ISDN (S1117), it is inputted to the HDLC controller 227 through the connector 222, DSU 223, ISDN interface unit 225, echo canceller 226 and port switch 229. When the HDLC controller 227 detects a flag pattern in the received data (S1118), the controller outputs an interruption request to the MPU 201, and the MPU 201 stores the received data in the memory 204 (S1119). The MPU 201 performs PPP synchronization-asynchronization conversion processing on the stored data (S1120), and transmits the data to the PC 103 via the serial communication controller 219 (S1121).

According to the above processing, PC 103 can perform data communication via ISDN.

3. Data Transmission by PC 106 According to PIAFS

When the PC 106 connected to the ISDN transmits data to a destination terminal capable of PIAFS data communication, communication application software of the PC 106 is started, and a transmission request is sent to. the PIAFS card 105 connected to the PC 106. In the PIAFS card 105, a transmission request is sent to the connected PHS telephone unit 104. The PHS telephone unit 104, which has received the transmission request, performs transmission to the radio communication apparatus 101 according to the sequence shown in FIG. 14, as similar to the case previously described in the section "1. Audio Data Communication Operation Executed by PHS Telephone Unit 102". The radio communication apparatus 101 performs transmission to the ISDN (S1001–S1004). Note that in this case, data element included in the call-setting message is set to unlimited digital data having 32 Kbps.

Upon receiving a response from the ISDN (S1005), as similar to the case previously described in the section "1. Audio Data Communication Operation Executed by PHS Telephone Unit 102", a response message is transmitted to the PHS telephone unit 104 (S1006), and the PHS telephone unit 104 notifies the PC 106 via the PIAFS card 105 that the destination terminal has responded.

Meanwhile, the radio communication apparatus 101 determines that the transmission data is PIAFS data since the data element included in the call-setting message is set to unlimited digital data having 32 Kbps, and switches the switch 230 and switch 231 of the port switch 229. More specifically, the switch 231 is switched such that the data line 251 is connected to the data line 252 through the I.460 data conversion processor 236, and the switch 230 is switched such that the data line 252 is connected to the data line 258 (S1011). Further, the echo canceller 226 is set in the through mode (S1012). In the above-described procedure, the data communication channel is established (S1013).

Upon establishing a communication channel, the PC 106 and the destination terminal exchange negotiations for the PIAFS protocol. The PIAFS negotiation frame transmitted by the PIAFS card 105 is received by the PHS baseband processor 239 of the radio communication apparatus 101 via the PHS telephone unit 104. The received 32 Kbps data is sent to the I.460 data conversion processor 236 via the data line 251 to be converted to 64 Kbps, and transmitted to the ISDN through port switch 229, echo canceller 226, ISDN interface unit 225 and DSU 223.

Since PIAFS data transmission/reception is realized between terminals connected via ISDN in the foregoing manner, data transmission/reception is started upon establishing a PIAFS link by the predetermined negotiation conforming to the PIAFS protocol.

The PIAFS card 105 adds a PIAFS header and trailer to the data (PPP protocol format) transmitted by the PC 106, and the data is transmitted to the destination terminal in the same flow as the aforementioned negotiation frame. At the destination terminal, the PIAFS header and trailer are deleted, and only the data in the PPP protocol format, stored in the data field, is extracted and processed by upper-layer software.

4. PIAFS Data Transmission by PC 106 According to PPP

Description is now provided in a case where the PC 106 performs data communication via ISDN with a destination device incapable of PIAFS data communication. In this case, since the PC 106 needs to transmit data in the form of PPP to the destination device, data conversion processing is necessary inside the radio communication apparatus 101.

When the PC 106 transmits data, communication application software of the PC 104 is started and a transmission request is sent to the PIAFS card 105 connected to the PC 106. In the PIAFS card 105, a transmission request is sent to the connected PHS telephone unit 104. The PHS telephone unit, which has received the transmission request, performs transmission to the radio communication apparatus 101 according to the sequence shown in FIG. 14, as similar to the case previously described in the section "1. Audio Data Communication Operation Executed by PHS Telephone Unit 102". When the PHS engine unit 237 of the radio communication apparatus 101 receives the transmission request from the PHS telephone unit (S1201), the engine unit 237 outputs an interruption request to the MPU 201 (S1202). The MPU 201 starts transmission processing of the ISDN interface (S1203), and transmits a call-setting message to ISDN (S1204). Note that in this case, since synchronous PPP data having 64 Kbps is transmitted, the data element included in the call-setting message is set to unlimited digital data having 64 Kbps.

Upon receiving a response from the ISDN (S1205), as similar to the case previously described in the section "1. Audio Data Communication Operation Executed by PHS Telephone Unit 102", a response message is transmitted to the PHS telephone unit 104 (S1206), and the PHS telephone unit 104 notifies the PC 106 via the PIAFS card 105 that the destination device has responded. As a result, a communication channel is established.

Meanwhile, the radio communication apparatus 101 switches the switch 230 and switch 231 of the port switch 229 in order to transmit the received PIAFS data to the ISDN as synchronous PPP data. More specifically, the switch 231 is switched such that the signal on the data line 251 is transmitted to a 32 Kbps PIAFS data interface unit of the PIAFS controller 228 through the I.460 data conversion processor 236 and data line 255, and the switch 230 is switched such that a 64 Kbps data interface unit of the HDLC controller 227 is connected to the data line 258 through the data line 257 and switch 230 (S1207). The echo canceller 226 is set in the through mode (S1208). The I.460 data conversion processor 236 is also set in the through mode for not performing conversion processing (S1209).

Upon establishing a communication channel, the PC 106 and the PIAFS controller 228 of the radio communication apparatus 101 negotiates the PIAFS protocol. A communication-parameter-setting request frame, transmitted by the PIAFS card 105, is received by the PHS baseband processor 239 of the radio communication apparatus 101 via the PHS telephone unit 104 (S1210). The received 32 Kbps data is inputted to the I.460 data conversion processor 236 via the data line 251. Since the I.460 data conversion processor is set in the through mode, data is inputted to the port switch 229 without conversion. The data inputted to the port switch 229 is inputted to the PIAFS controller 228 via the switch 231.

In response to the communication-parameter-setting request frame, the PIAFS controller transmits a communication-parameter-setting reception frame to the PC 106 via the PHS engine unit 237 (S1211), and upon predetermined negotiation steps, a radio-data-transmission link (PIAFS link) is established (S1212).

When the PIAFS link is established between the PIAFS card 105 and PIAFS controller 228, the PC 106 starts data transmission to the ISDN. More specifically, the PIAFS card 105 adds a PIAFS header and trailer to the PPP-format data transmitted by the PC 106, and the data is inputted to the PIAFS controller 228 in the similar manner to the aforementioned negotiation frame.

The PIAFS controller 228, which has received the data, deletes the header and trailer of the PIAFS frame, and transfers the PPP data to the memory 204 (S1213) After the PPP data is converted into a synchronous PPP format (S1214), the MPU 201 writes the data stored in the memory 204 into the HDLC controller 227 (S1215), and the HDLC controller 227 outputs the data in synchronization with 64 KHz timing of ISDN. The outputted data is transmitted to the ISDN through the switch 230, echo canceller 226, ISDN interface unit 225 and DSU 223 (S1216).

Conversely, when data is received from the ISDN (S1217), it is inputted to the HDLC controller 227 through the connector 222, DSU 223, ISDN interface unit 225, echo canceller 226 and port switch 229. When the HDLC controller 227 detects a flag pattern in the received data (S1218), the controller outputs an interruption request to the MPU 201, and the MPU 201 stores the received data in the memory 204 (S1219). The MPU 201 performs PPP synchronization-asynchronization conversion processing on the stored data (S1220), and transmits the data to the PC 106 via the PHS engine unit 237 after adding a header and trailer by the PIAFS controller 228 (S1221).

As set forth above, while data transmission/reception is performed between the PC 106 and ISDN, synchronous PPP data communication is realized via the ISDN.

5. Facsimile Transmission

In a case where facsimile transmission is started by the operation panel 210, a document is read by the scanner 209, then the read image data is encoded into G3 facsimile codes by the FAX engine unit 205 and sent to the FAX modem 213.

A 9600 bps analogue signal modulated by the FAX modem 213 is inputted to the analogue switch 217, outputted to the PHS engine unit 237, and coded to PCM data by the CODEC of the PHS baseband processor 239 or 240. Note that at this stage, the analogue switch 217 is switched so as to use either the PHS baseband processor 239 or 240 which is not in use. For instance, when the PHS baseband processor 239 is not used, the signal outputted by the FAX modem 213 is inputted to the PHS baseband processor 239 via the data line 245, and the data converted to PCM codes by the PHS baseband processor 239 is outputted to the port switch 233 via the data line 247.

The port switches 233 and 229 are switched such that the data line 247 is connected to the data line 258. The data is transmitted to the ISDN through the echo canceller 226, ISDN interface unit 225 and DSU 223. Note that the echo canceller 226 is set in the through mode.

In the conventional facsimile apparatus, the analogue signal modulated by the FAX modem 213 is transmitted via an analogue line without conversion. However, since the CPU used in the configuration of the present embodiment is independent from the facsimile processing for the wireless line controller and ISDN control, the conventional facsimile unit can be used without greatly changing its design. In addition, the command which has been exchanged between the conventional facsimile unit and a data terminal via a parallel interface unit, can be adopted by a data terminal which performs communication via a PHS telephone unit. By communicating between the data terminal and the CPU 206 of the facsimile unit via the shared register 218, the data terminal 106 connected to the PHS is able to use the color printer 208 and color scanner 209 of the facsimile unit.

In a case where audio data inputted to the handset 214 is transmitted, the connection of the analogue switch 217 is changed from the above facsimile-communication setting, and the echo canceller 226 is set in the echo-cancel mode. The data flow is the same as that in the case of facsimile communication.

6. Printing Request by PC 106

When a print request is sent by the PC 106, a PIAFS link is established between the PIAFS card 105 and radio communication apparatus 101 in the similar manner to the case described in "4. PIAFS Data Transmission by PC 106 According to PPP", and the data transmitted by the PC 106 is stored in the memory 204.

The data stored in the memory 204 is written in the shared register 218 by the MPU 101. When a predetermined amount of data is written in the shared register 218, the shared register outputs an interruption request to the CPU 206 of the FAX engine unit 205, and the CPU 206 which has received the interruption request transfers the data in the shared register to the printer 208 where printing is performed.

Second Embodiment

Figure 16:
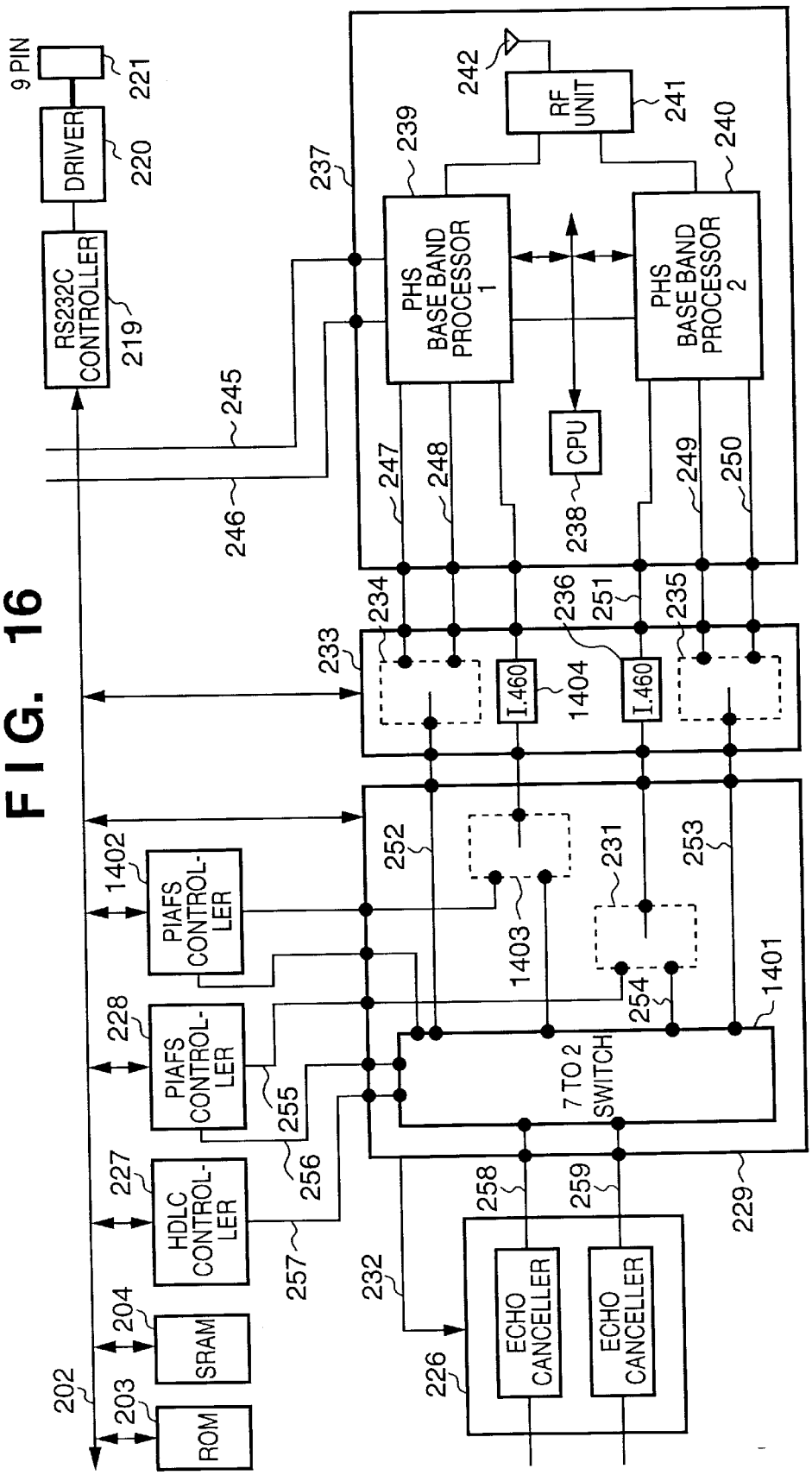
FIG. 16 is a block diagram showing a construction of a radio communication apparatus according to the second embodiment.
Figure 17:
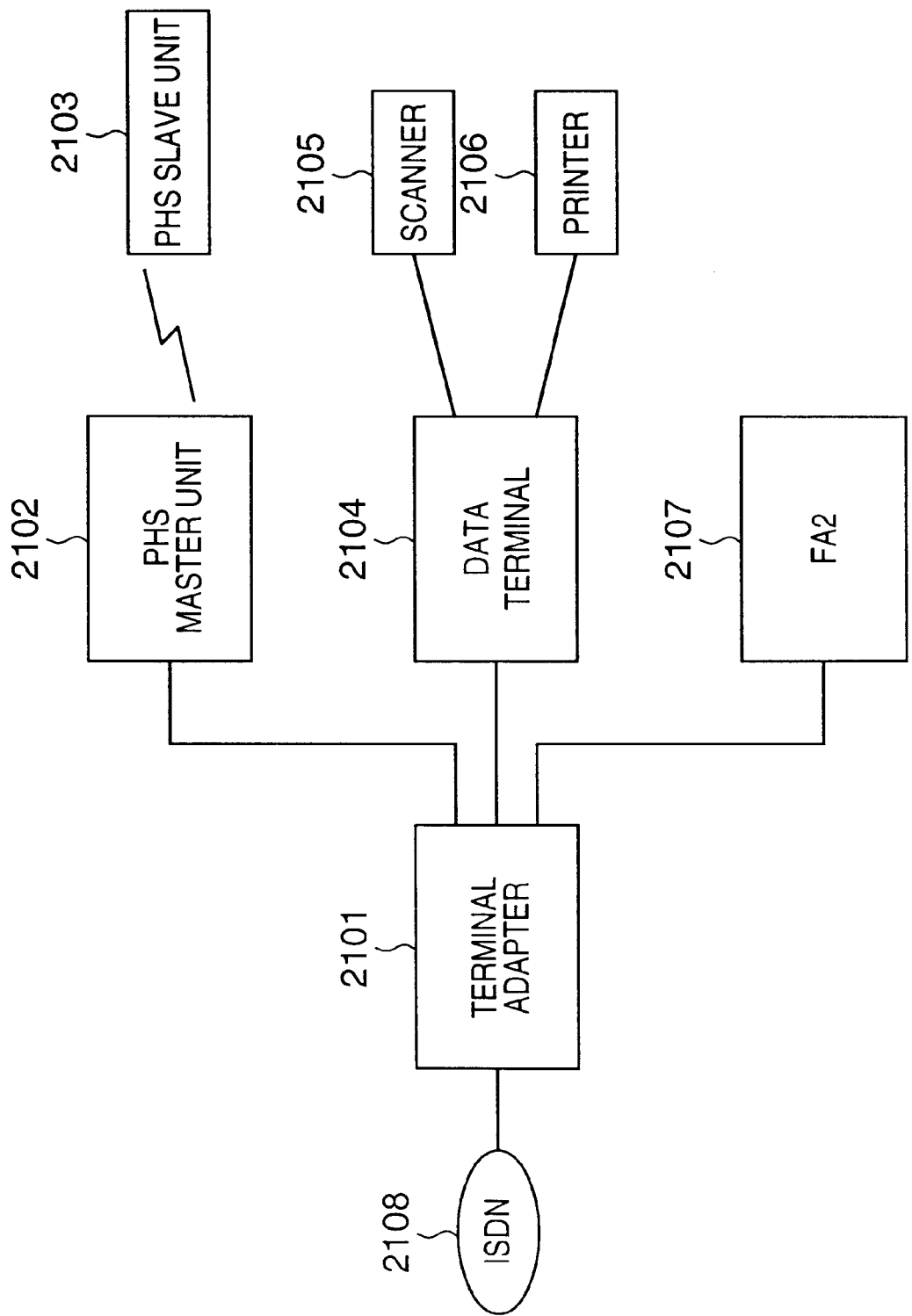
FIG. 17 is a block diagram showing a system construction in a case of using the conventional terminal adapter.
Figure 18:
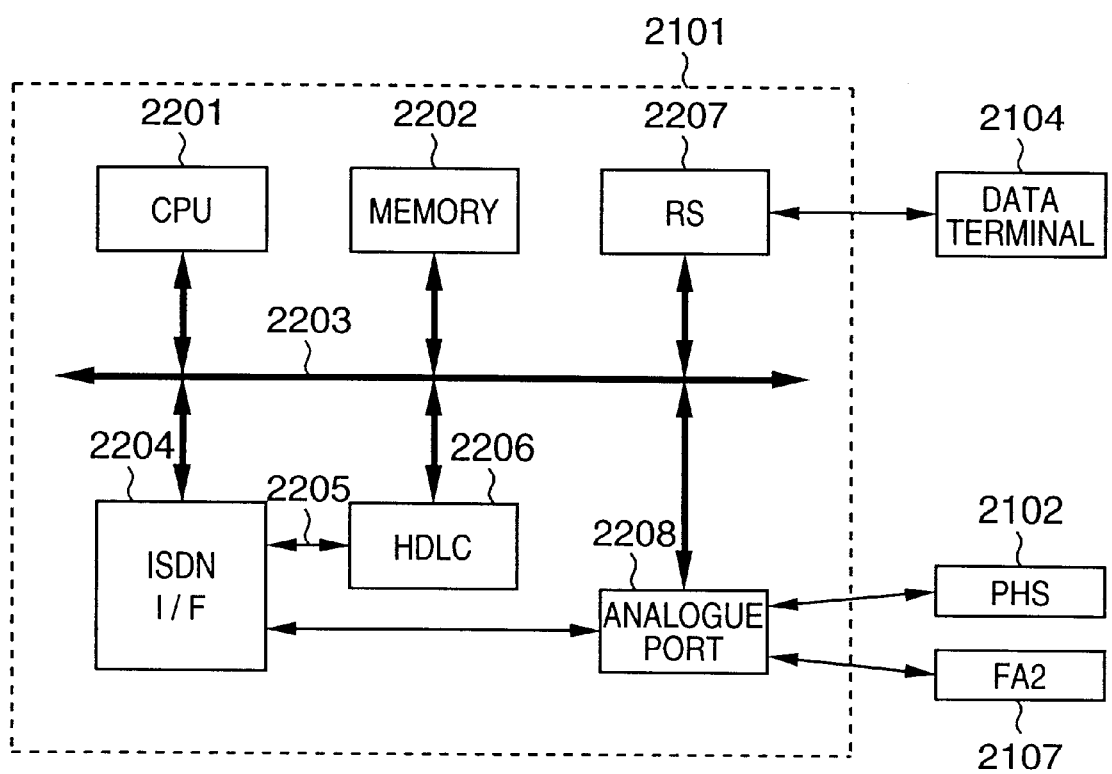
FIG. 18 is a block diagram showing the internal structure of the conventional terminal adapter.
Figure 19:
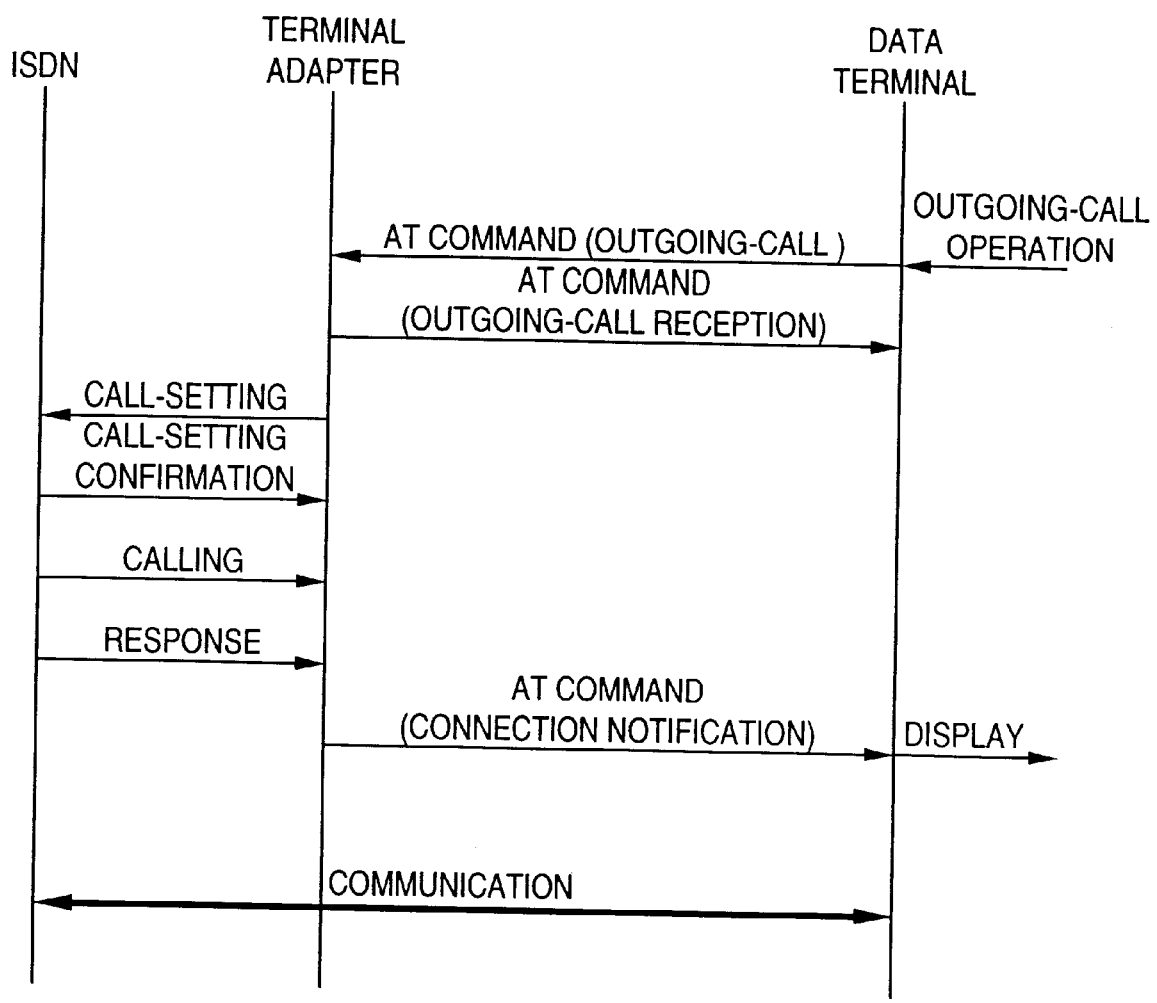
FIG. 19 is a flowchart describing a communication sequence at the time of data transmission of the conventional terminal adapter.
Figure 20:
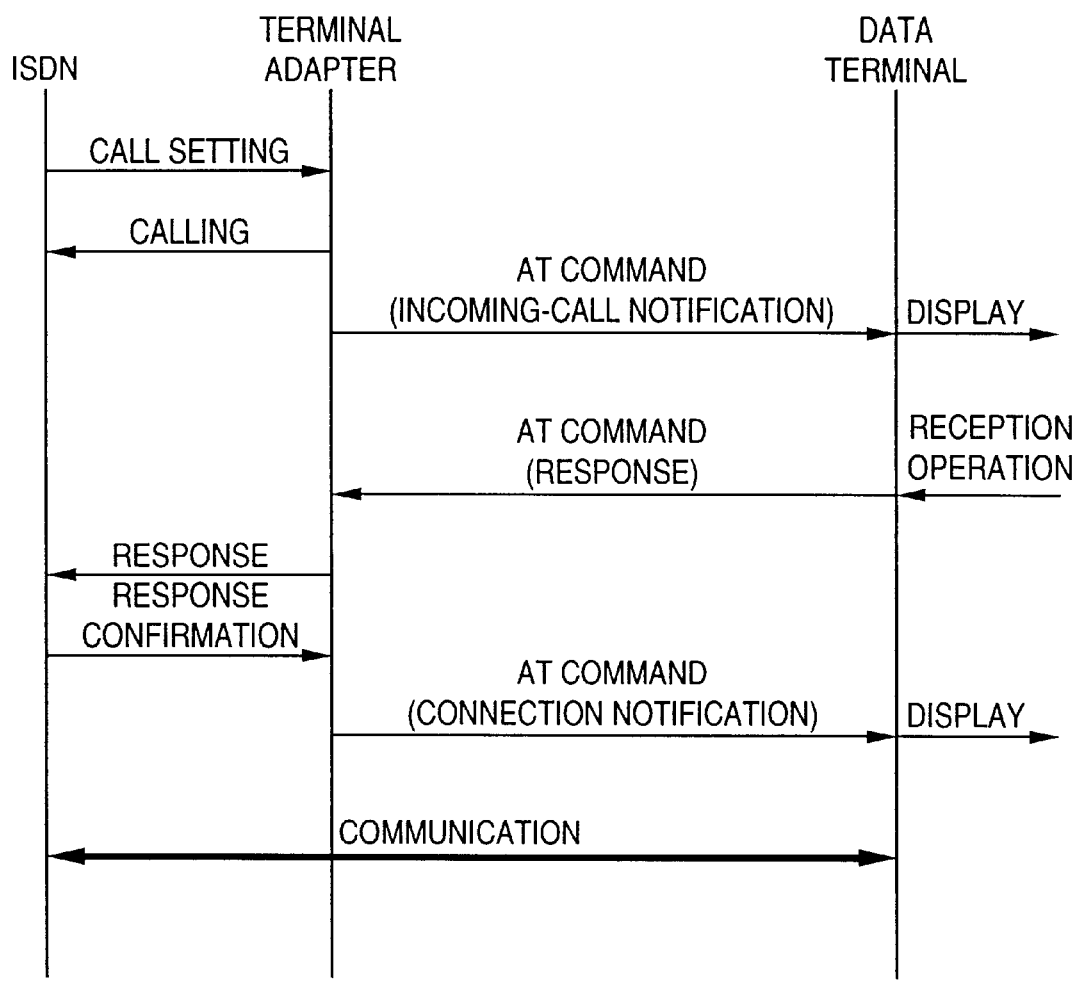
FIG. 20 is a flowchart describing a communication sequence at the time of data reception of the conventional terminal adapter.

In the above-described first embodiment, it is assumed that radio data communication is performed using one channel. However, by altering the hardware configuration shown in FIG. 2 to that in FIG. 16, it is possible to perform radio data communication using two channels.

More specifically, the 5 to 2 switch 230 is replaced by a 7 to 2 switch 1401; and a PIAFS controller 1402, a switch 1403 and an I.460 processor 1404 are added. Accordingly, PIAFS processing is performed in correspondence with the PHS baseband processors 239 and 240 respectively, realizing radio data communication by two channels.

Third Embodiment

In the above-described first embodiment, the PHS (Personal Handy-phone System) is used as the radio communication method, and PIAFS is adopted as the radio-data-transmission protocol. However, similar advantages can be obtained even if other radio communication method and radio-data-transmission protocol are used.

Fourth Embodiment

In the foregoing embodiments, only one channel out of channels available for PHS communication or ISDN communication, is used. However, by switching the port switch, it is possible to perform communication by using the other channels. In addition, it is possible to perform communication by using two channels simultaneously.

Fifth Embodiment

Figure 21:
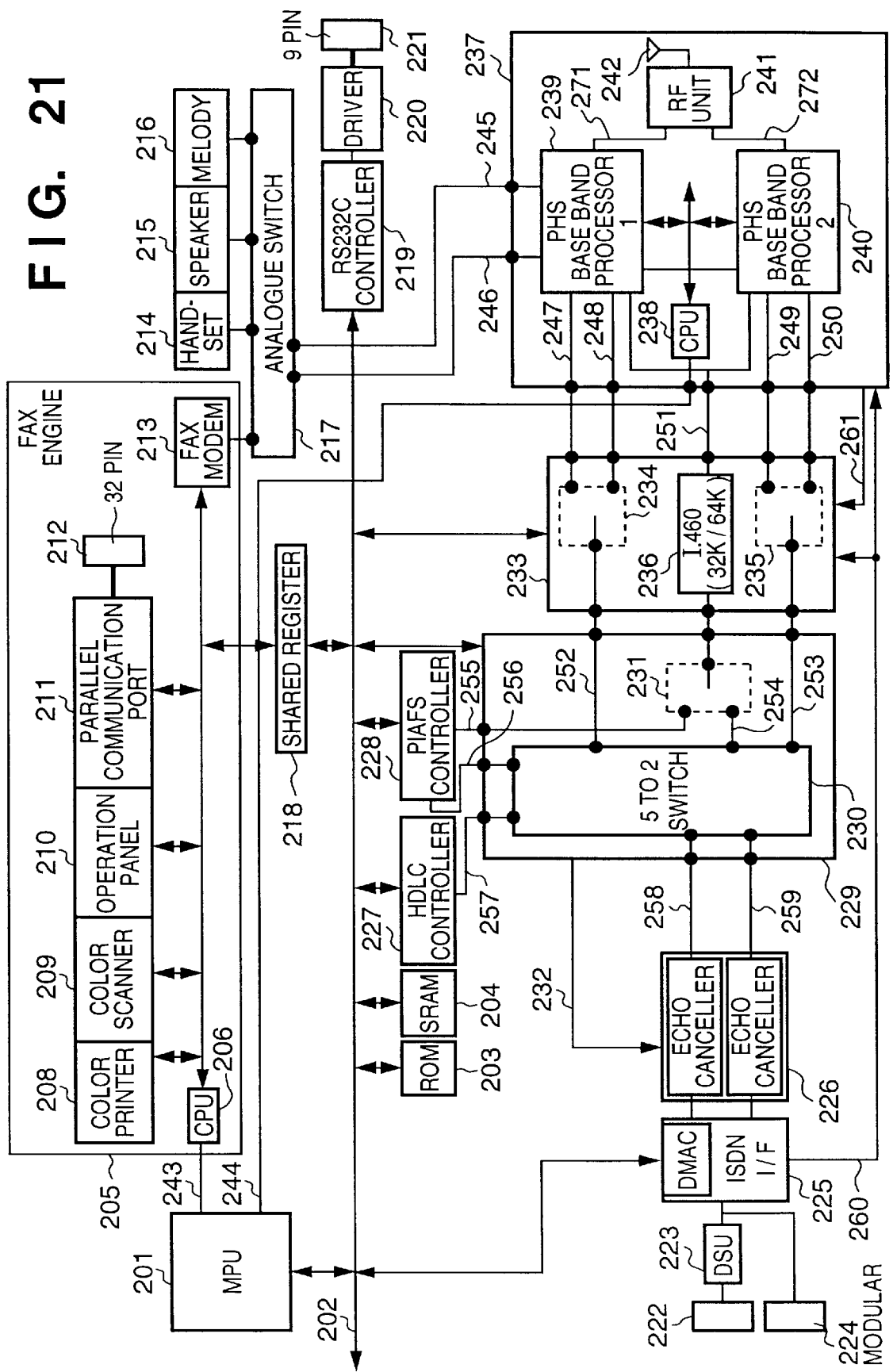
FIG. 21 is a block diagram showing a construction of a radio communication apparatus according to the fifth embodiment of the present invention.

In the above-described embodiments, the handset 214, speaker 215 and holding melody generator 216 shown in FIG. 2 are controlled by the CPU 206 of the FAX engine unit 205. However, as shown in FIG. 21, the FAX modem 213 may be controlled by the CPU 206, and the handset 214, speaker 215 and holding melody generator 216 may be controlled by the MPU 201.

Furthermore, in the foregoing first embodiment, description has been given on various communication operation by referring to the flowcharts in FIGS. 11–13. However, the control operation of each of the units, constituting the present radio communication apparatus, can be realized by a plurality of microcomputers (MPU 201, CPU 206, CPU 238) which interactively operate respective control programs for executing the above-described various communication operation.

Hereinafter, control operation executed by each of the microcomputers is described.

The MPU 201 performs ISDN calling control, controls the serial interface unit which exchanges data with PC, controls each data path for audio data communication, data communication and FAX communication, and manages resources thereof.

The CPU 206 controls peripheral devices of the FAX engine unit (color printer 208, color scanner 209, operation panel 210 and FAX modem 213) and manages the resources thereof.

The CPU 238 controls the PHS baseband processors 239 and 240 and RF unit in the PHS engine unit 237, and manages the resources thereof.

Note that the control programs for executing the control operation described below are stored in ROMs of the MPU 201, CPU 206 and CPU 238.

(1) Control Operation of MPU 201

Figure 22:
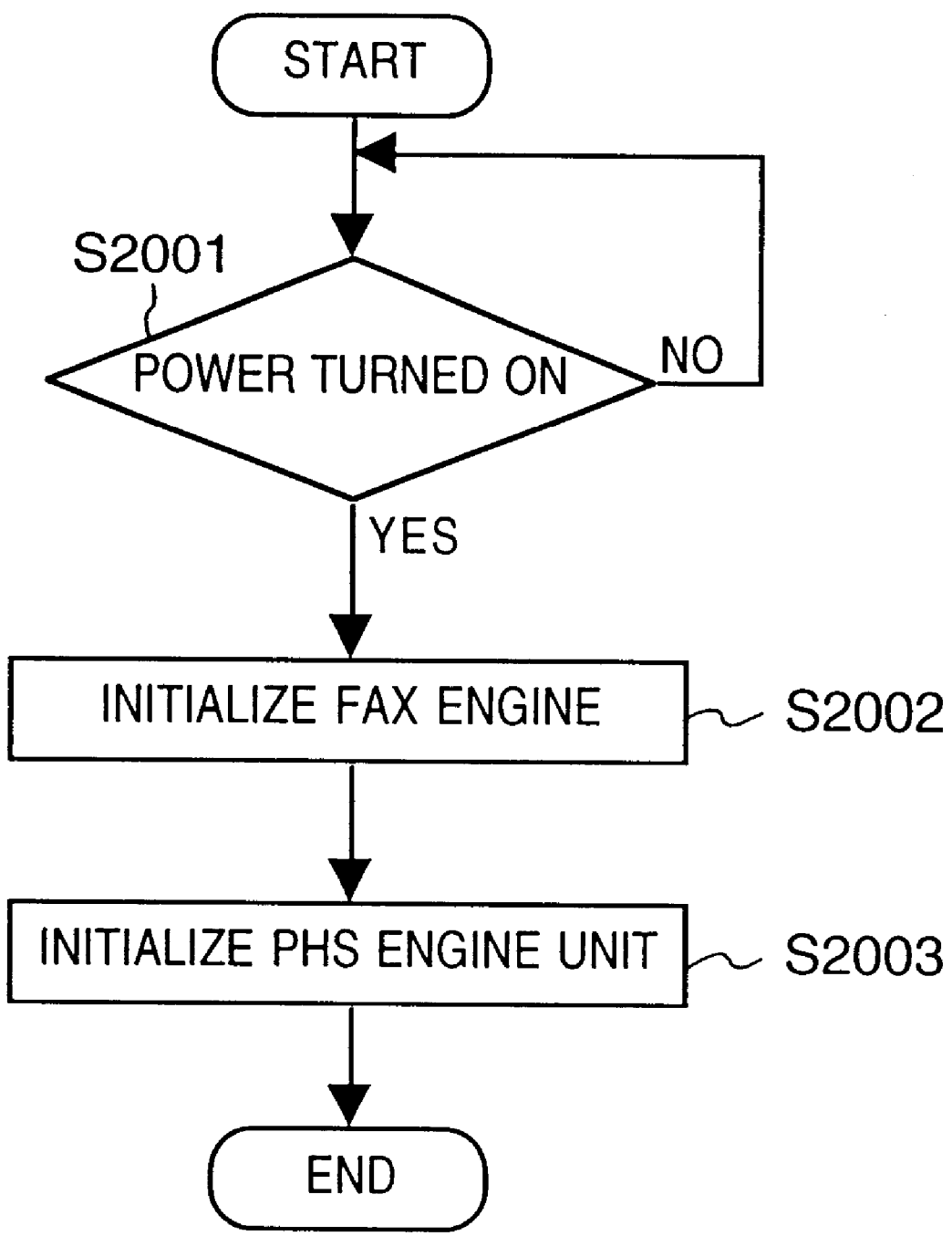
FIG. 22 is a flowchart describing control operation of an MPU 201.

FIG. 22 is a flowchart describing control operation of the system initialization.

When the power of the apparatus is turned on (S2001), the MPU 201 first starts-up each device (start-up each device), then sends an initialization command to the CPU 206 (S2002) and further sends an initialization command to the CPU 238 (S2003). To the CPU 206, the command is transmitted via the serial communication port 243, while to the CPU 238, the command is transmitted via the serial communication port 244.

Figure 23:
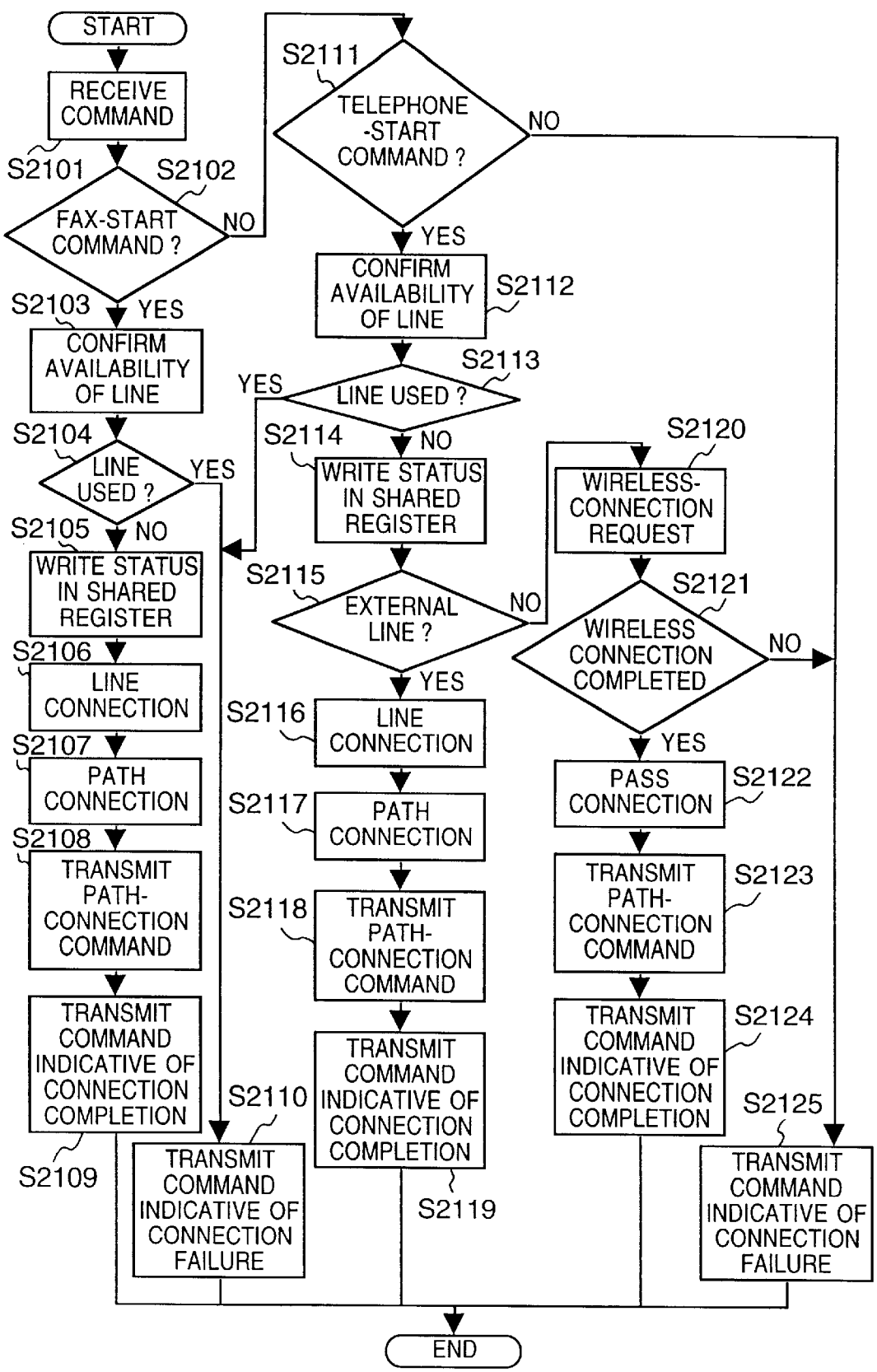
FIG. 23 is a flowchart describing control operation of the MPU 201.

FIG. 23 is a flowchart describing control operation of receiving signals from the CPU 206 of the MPU 201.

When a command is received from the CPU 206 via the serial communication port 243 (S2101), it is determined whether or not the received command includes a FAX-start command and a telephone number (S2102). If the command includes a FAX-start command and a telephone number, line availability is determined by reading data of the shared register 218 (S2103 and S2104). If the line is available, the FAX communication is assigned to the available line, and status data indicative of FAX communication is written in the shared register 218 (S2105). Control for line connection is executed by using the ISDN I/F unit 225 (S2106); for instance, when channel B1 is connected, a path is established in the analogue switch 217, by connecting the FAX modem 213 with the analogue signal line 245. Then, the switch 233 is switched so as to establish a path in the switch 234 by connecting the PCM data line 247 with the data line 252, and establish a path in the switch 230 by connecting the port 252 with the port 258 (S2107) Further, a command is outputted to the CPU 238 via the serial communication port 244 so as to establish a path in the PHS baseband processor 239 by connecting the analogue signal line 245 with the PCM data line 247 (S2108). Then, a command indicative of connection completion is outputted to the CPU 206 via the serial communication port 243 (S2109).

When a telephone-start command and a telephone number are transmitted by the CPU 206 via the serial communication port 243 (S2111), the MPU 201 determines whether the command is addressed to an extension slave unit or an external line. Then, data of the shared register 218 is read out to determine whether or not the ISDN line or PHS wireless line is available (S2112 and S2113). If one of the line is available, the telephone communication is assigned to the available line, and status data indicative of telephone communication is written in the shared register 218 in correspondence with the respective communication paths (S2114). In a case where the command is addressed to an external line (S2115), control for line connection is executed by using the ISDN I/F unit 225 (S2116) For instance, if channel B1 is connected, a path is established in the analogue switch 217 by connecting the handset 214 with the analogue signal line 245. Then, the switch 233 is switched so as to establish a path in the switch 234 by connecting the PCM data line 247 with the data line 252, and establish a path in the switch 230 by connecting the port 252 with the port 258 (S2117). Further, a command is outputted to the CPU 238 via the serial communication port 244 so as to establish a path in the PHS baseband processor 239 by connecting the analogue signal line 245 with the PCM data line 247 (S2118). Then, a command indicative of connection completion is outputted to the CPU 206 via the serial communication port 243 (S2119) In a case where the command is addressed to an internal line, a wireless connection command is outputted to the CPU 238 via the serial communication port 244 (S2120). When a command indicative of connection completion via the first channel is returned by the CPU 238 (S2121), a path is established in the analogue switch 217, by connecting the handset 214 with the analogue signal line 245 (S2122). Further, the MPU 201 instructs the CPU 238 by sending a command via the serial communication port 244, so as to establish a path in the PHS baseband processor 239 by connecting the analogue signal line 245 with the RF unit 241 (S2123), and returns a command indicative of connection completion to the CPU 206 (S2124)

Figure 24:
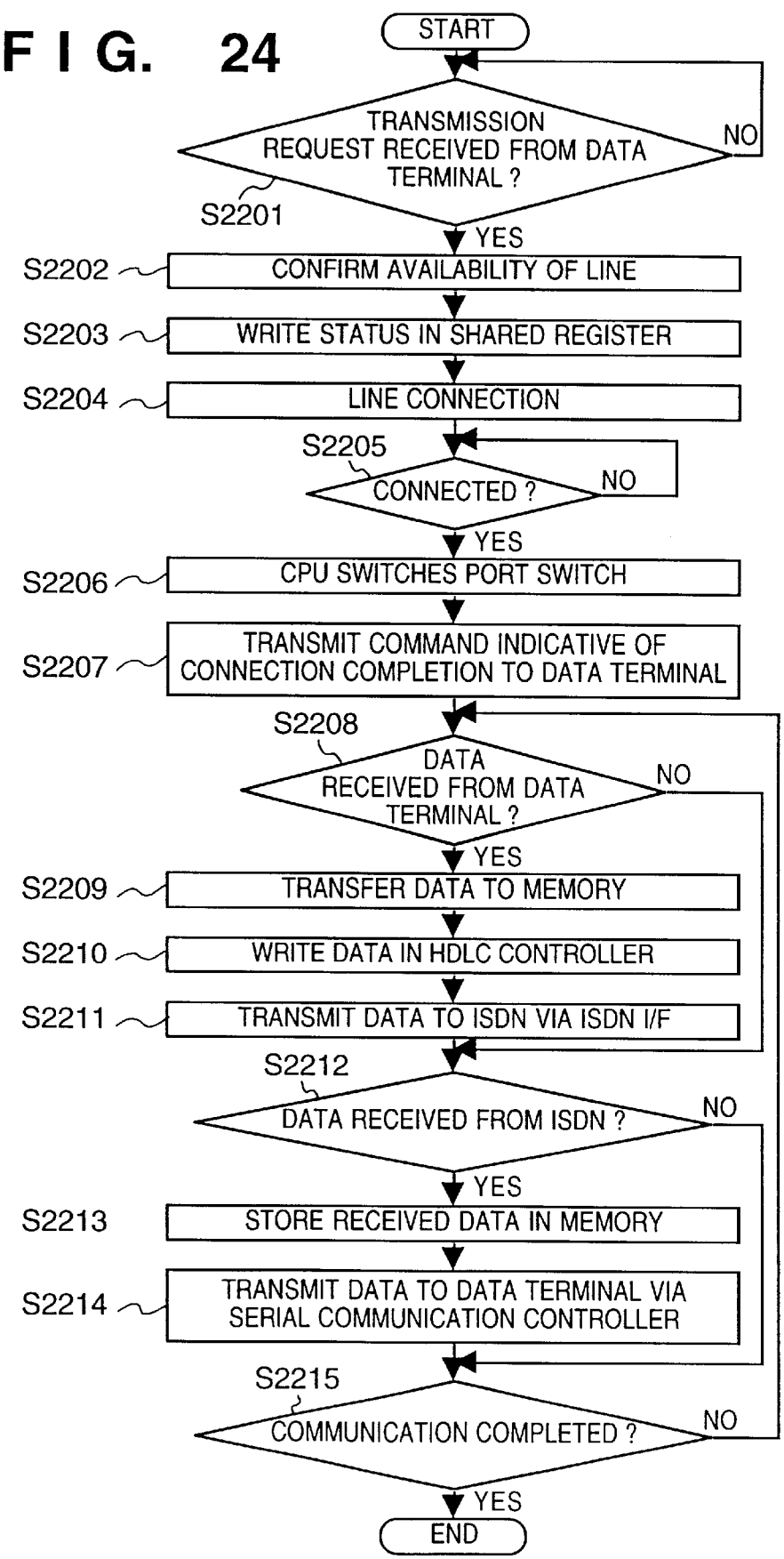
FIG. 24 is a flowchart describing control operation of the MPU 201.

FIG. 24 is a flowchart showing control operation of data communication performed by a data processing terminal (e.g., personal computer) connected via a wired interface unit.

The radio communication apparatus according to the present embodiment is capable of data transmission/reception with the personal computer (PC) through the RS232C connector 221. At the time of data transmission/reception, data from the PC is stored in the SRAM 204 via an RS232C controller, and analyzed by the MPU 201. In the present system, when communication is performed with a PC, AT command is used as the control command. Therefore, if the data transmitted by the PC is an AT command, it is recognized as control data; while if the data other than AT command is transmitted, the data is recognized as real data.

When a control command for data transmission request is transmitted by the PC through the RS232C controller 219 (S2201), the MPU 201 reads out data of the shared register 218 to determine whether or not the ISDN line is available (S2202). If the line is not available, a connection-failure command is outputted to the PC via the RS232C controller 219. If the line is available, the communication is assigned to the available line, and the status data indicating that the ISDN line is performing data communication, is written in the shared register 218 (S2203). Then, control for line connection is executed by using the ISDN I/F unit 225 (S2204). For instance, if channel B1 is connected (S2205), the port 257 is connected with the port 258 in the switch 230 (S2206), and a control command indicative of connection completion is outputted to the PC through the RS232C controller 219 (S2207). Real data sent by the PC, which has been stored in the SRAM 204 through the RS232C controller 219 (S2208) is temporarily stored in the SPAM 204 (S2209), and the data stored in the SRAM 204 is written in the HDLC controller 227 (S2210) and outputted to the ISDN line (S2211). When data is received from the ISDN line (S2212), the data received from the ISDN line is temporarily stored in the SRAM 204 (S2213) and outputted to the PC through the RS232C controller 219 (S2214).

Figure 25:
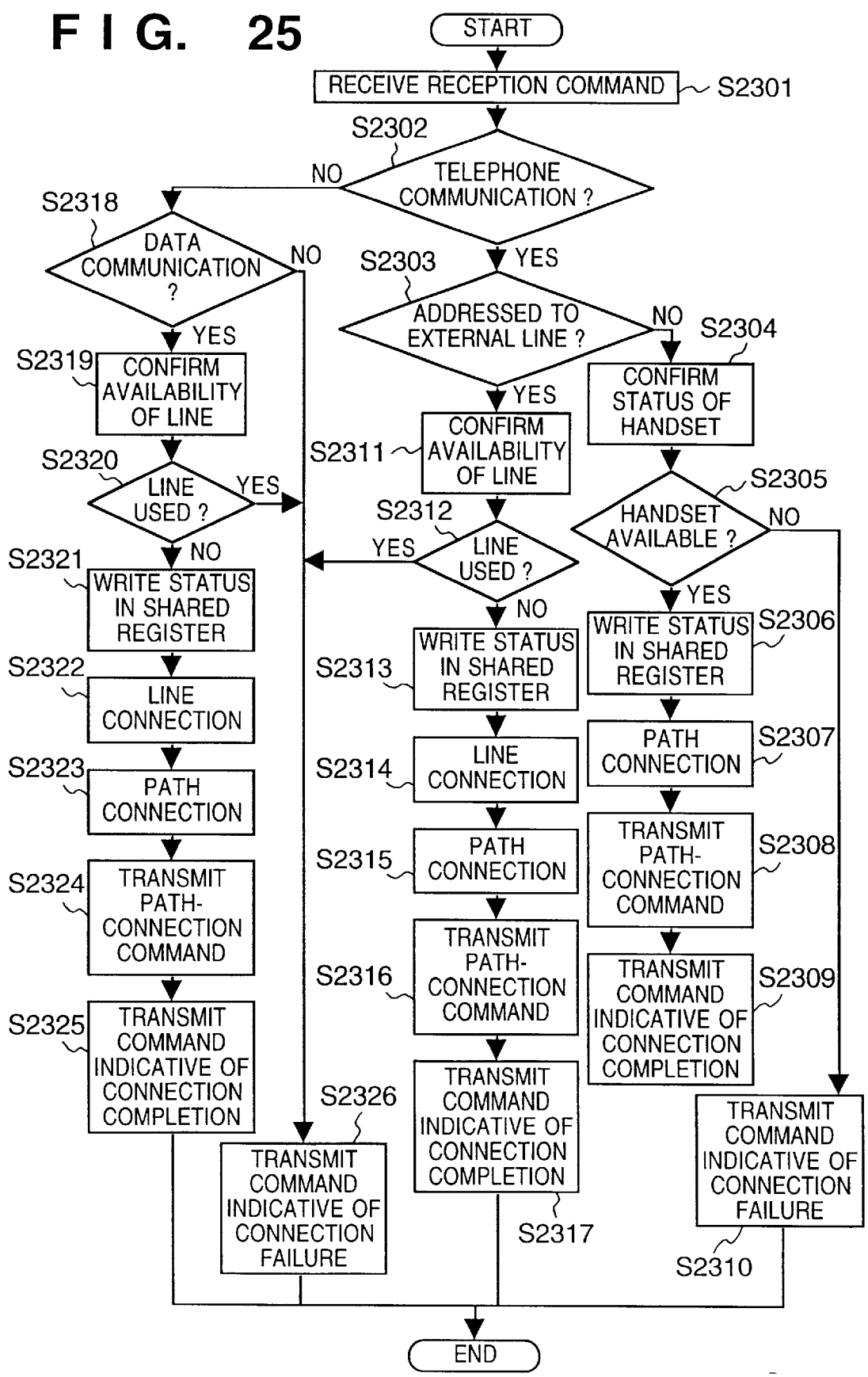
FIG. 25 is a flowchart describing control operation of the MPU 201.

FIG. 25 is a flowchart showing control operation of the MPU 201 when receiving signals from the CPU 238.

When a reception command is received from the CPU 238 through the serial communication port 244 (S2301), the MPU 201 analyzes whether the command is for telephone communication or for data communication, and if the command is for telephone communication (S2302), the MPU 201 determines whether the command from CPU is addressed to a master unit or an external unit (S2303).

If the command is addressed to a master unit, status data of the shared register 218 is read (S2304) If the handset of the master unit is available (S2305), the telephone communication is assigned to the available handset and the status of the master unit handset is set to a busy state in the shared register 218 (S2306). Then, a path is established in the analogue switch 217 by connecting the handset 214 with the analogue signal line 245 (S2307). Further, the MPU 201 instructs the CPU 238 by sending a command via the serial communication port 244, so as to establish a path in the PHS baseband processor 239 by connecting the analogue signal line 245 with the RF unit 241 (S2308), and returns a command indicative of connection completion to the CPU 238 (S2309).

If the command is addressed to an external unit, status data of the shared register 218 is read (S2311).

If the ISDN line is available (S2312), the communication is assigned to the available ISDN line and the status of the ISDN line is set to the communication state in the shared register 218 (S2313). Then, connection is established with the ISDN line (S2314). When, for instance, ISDN channel B is used, the switch 234 in the switch 233 is connected to the analogue signal line 247, and the port 258 of the switch 229 is connected to the port 252 (S2315) Further, the MPU 201 instructs the CPU 238 by sending a command via the serial communication port 244, so as to establish a path in the PHS baseband processor 239 by connecting the analogue signal line 245 with the RF unit 241 (S2316), and returns a command indicative of connection completion to the CPU 238 (S2317).

In a case of data communication (S2318), status data of the shared register 218 is read (S2319). If the ISDN line is available (S2320), the data communication is assigned to the available ISDN line and the ISDN line status is set to the communication state in the shared register 218 (S2321)

Then, connection is established with the ISDN line (S2322). In a case where PIAFS data transmitted by the PHS telephone unit is outputted to the ISDN line without conversion, the data is outputted to the port 254 of the switch 231, and the port 254 of the switch 230 is connected to the port 258 (S2323). Further, the MPU 201 instructs the CPU 238 by sending a command via the serial communication port 244, so as to establish a path in the PHS baseband processor 239 by connecting the 32 Kbps data communication line 251 with the RF unit 241 (S2324), and returns a command indicative of connection completion to the CPU 238 (S2325). By this, data transmitted from the PHS unit at 32 Kbps is converted to 64 Kbps by the I.460 data conversion processor 236 and transmitted to the ISDN.

In a case where the PIAFS data transmitted by the PHS telephone unit is outputted to the ISDN after being converted to PPP data, the data is outputted to the port 255 of the switch 231, and the port 257 of the switch 230 is connected to the port 258 (S2323). Further, the MPU 201 instructs the CPU 238 by sending a command via the serial communication port 244, so as to establish a path in the PHS baseband processor 239 by connecting the 32 Kbps data communication line 251 with the RF unit 241 (S2324), and returns a command indicative of connection completion to the CPU 238 (S2325). By this, PIAFS data transmitted by the PHS telephone unit is temporarily stored in the SRAM 204 as PPP data through the PIAFS controller 228, and transmitted to the line through the HDLC controller 227.

Figure 26A:
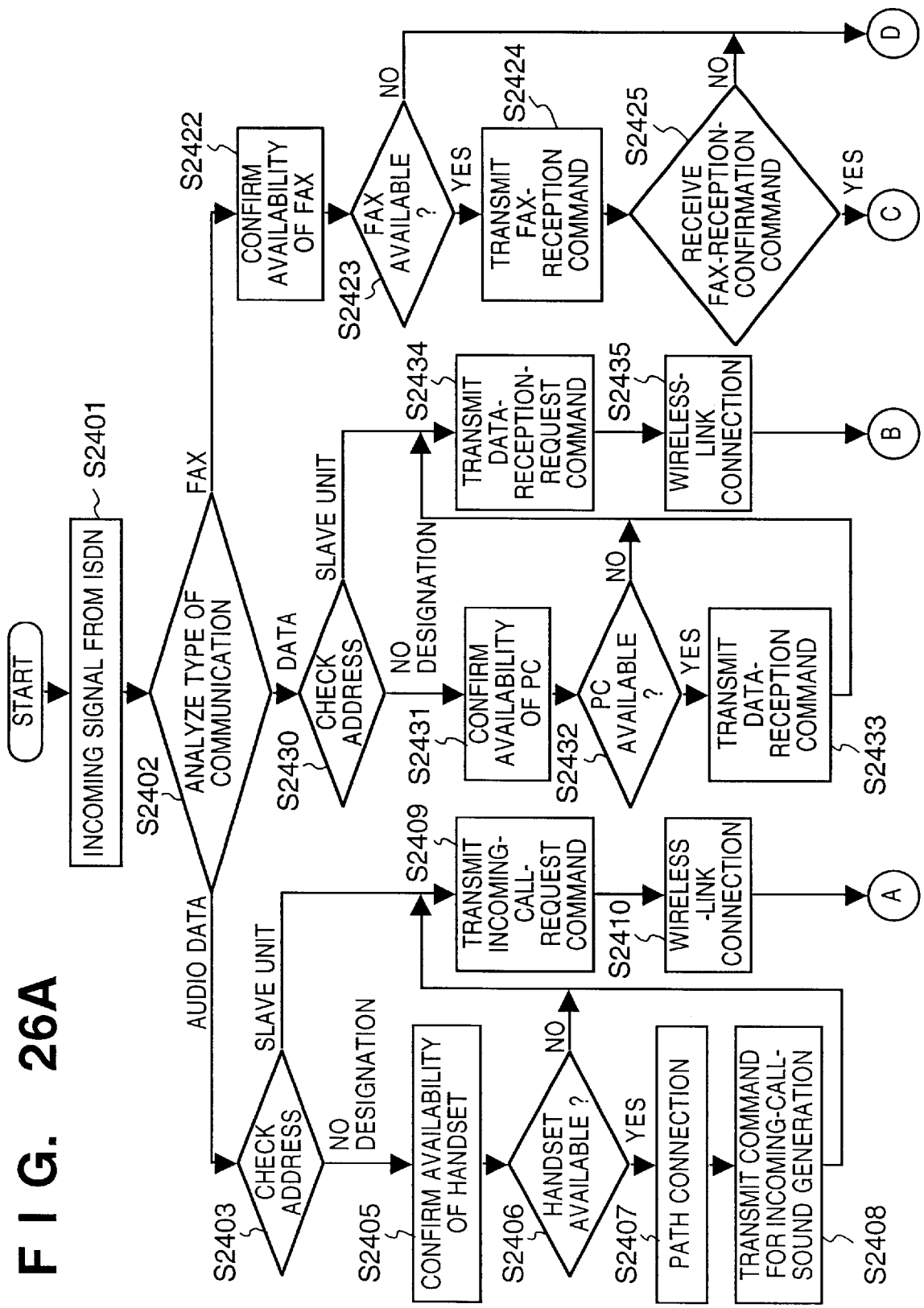
FIGS. 26A and 26B are flowcharts describing control operation of the MPU 201.
Figure 26B:
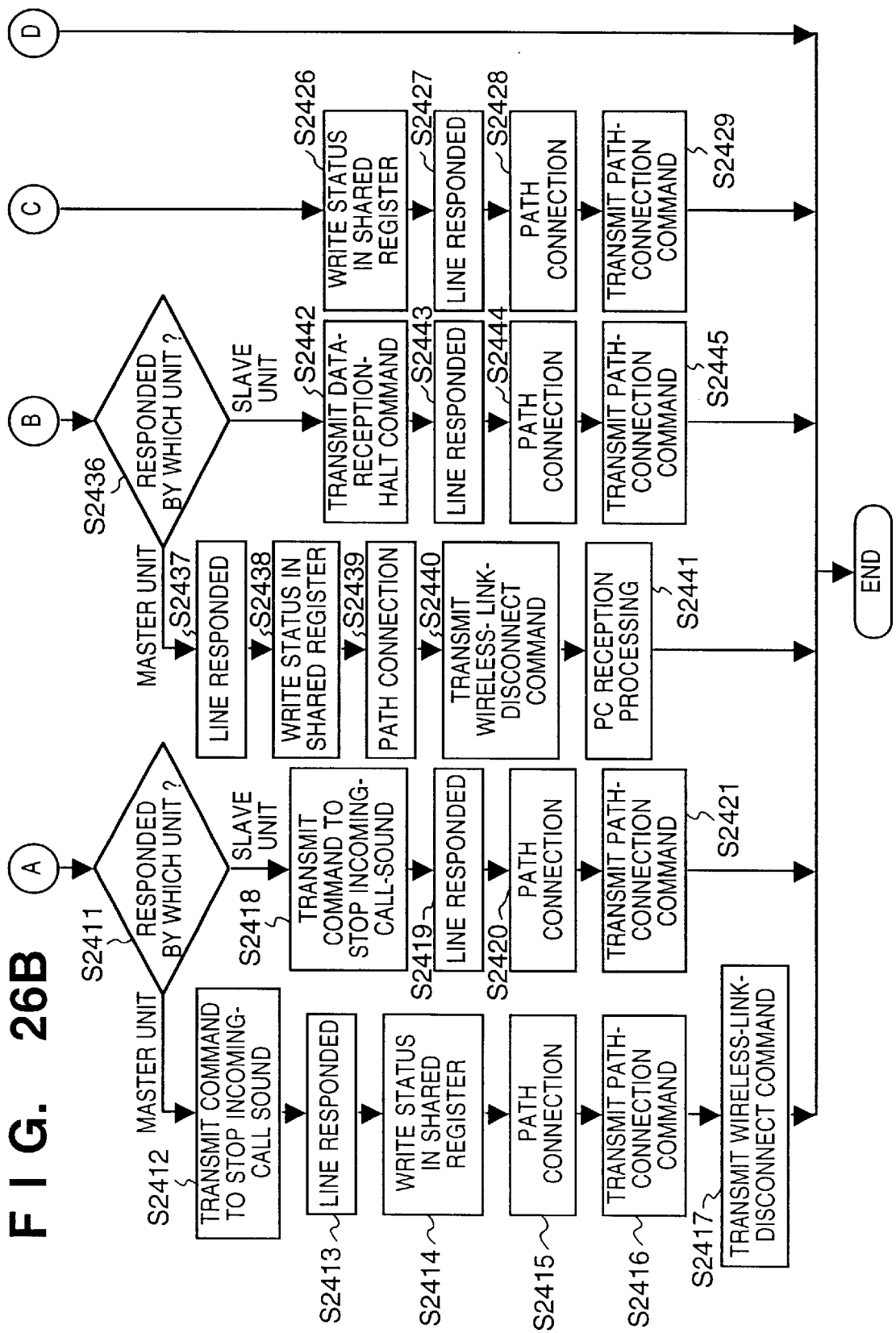

FIGS. 26A and 26B are flowcharts showing control operation of incoming signals from ISDN.

When an incoming signal is received by the ISDN I/F unit 225 (S2401), the MPU 201 analyzes the contents of the incoming signal (S2402).

In a case of audio data, an address is checked (S2403). If there is no particular designation, e.g., addressed to a master unit or slave unit, the shared register is read to confirm whether or not the handset of the master unit is used (S2405). If it is not used (S2406), the MPU 201 establishes a path in the analogue switch 217 by connecting the speaker 215 with the analogue signal line 245 (S2407). Then, the MPU 201 outputs an incoming-call-sound-generation-request command to the CPU 238 via the serial communication port 244 (S2408). Upon receiving the incoming-call-sound-generation-request command, the CPU 238 generates an incoming-call sound by using a sound source in the PHS baseband processor and outputs the sound to the analogue signal line 245. Further, the MPU 201 outputs an. incoming-call-request command to the CPU 238 via the serial communication port 244 (S2409). The CPU 238 begins establishing a wireless-link by using the PHS baseband processor 239 and RF unit 241 (S2410). Upon off-hook of the handset of the master unit (S2411), the MPU 201 outputs a command to the CPU 238 via the serial communication port 244 to stop the incoming-call-sound (S2412). Further, the MPU 201 returns a response to the ISDN (S2413) and establishes connection with the ISDN. Then, the status of the handset is set in the busy state in the shared register (S2414). For instance, when the channel B1 is connected, the MPU 201 establishes a path in the analogue switch 217 by connecting the handset 214 with the analogue signal line 245, and establishes a path in the switch 230 by connecting the port 258 with the port 252. Then, the port 252 is connected to the PCM data line 247 using the switch 234 (S2415). Further, the MPU 201 instructs the CPU 238 by sending a command via the serial communication port 244, so as to establish a path in the PHS baseband processor 239 by connecting the PCM data line 247 with the analogue signal line 245 (S2416). Then, the MPU 201 sends a PHS disconnect command to the CPU 238 via the serial communication port 244 (S2417).

When a slave unit responds, the CPU 238 sends the MPU 201 a response command via the serial communication port 244. The MPU 201 outputs a command to the CPU 238 via the serial communication port 244 to stop the incoming-call-sound (S2418). Further, the MPU 201 returns a response to the ISDN (S2419) and establishes ISDN connection. For instance, when the channel B1 is connected, the MPU 201 establishes a path in the analogue switch 217 by connecting the handset 214 with the analogue signal line 245, and establishes a path in the switch 230 by connecting the port 258 with the port 252. Then, the port 252 is connected to the PCM data line 247 using the switch 234 (S2420). Further, the MPU 201 instructs the CPU 238 by sending a command via the serial communication port 244, so as to establish a path in the PHS baseband processor 239 by connecting the PCM data line 247 with the RF unit 241 (S2421).

In a case of receiving a FAX signal, the MPU 201 reads the shared register 218, to confirm the status of a peripheral device for FAX reception (S2422). If the peripheral device is available (S2423), the MPU 201 sends a FAX reception command to the CPU 206 via the serial communication port 243 (S2424). When the MPU 201 receives a FAX-reception-confirmation command from the CPU 206 through the serial communication port 243 (S2425), the MPU 201 writes FAX reception status in the shared register 218 (S2426), returns a response to the ISDN side and establishes connection with the ISDN (S2427). For instance, when the channel B1 is connected, the MPU 201 establishes a path in the analogue switch 217 by connecting the FAX modem 213 with the analogue signal 245, and establishes a path in the switch 230 by connecting the port 258 with the port 252. Then, the port 252 is connected to the PCM data line 247 using the switch 234 (S2428). Further, the MPU 201 instructs the CPU 238 by sending a command via the serial communication port 244, so as to establish a path in the PHS baseband processor 239 by connecting the PCM data line 247 with the analogue signal line 245 (S2429).

In a case of data reception, an address is checked (S2430). If there is no particular designation, e.g., addressed to a master unit or slave unit, the shared register is read to confirm whether or not the PC connected to the master unit is available (S2431). If it is available (S2432), the MPU 201 outputs a data reception command to the PC via the RS232C controller (S2433). Then, the MPU 201 outputs a data-reception-request command to the CPU 238 via the serial communication port 244 (S2434). The CPU 238 begins establishing a wireless-link by using the PHS baseband processor 239 and RF unit 241 (S2435). When a response is returned from the PC connected to the master unit (S2436), the MPU 201 returns a response to the ISDN and establishes connection with the ISDN (S2437). Then, the status of the PC is set in the used state in the shared register (S2438). For instance, when the channel B1 is connected, the MPU 201 connects the port 258 with the port 257 using the switch 230 (S2439). Then, the MPU 201 sends a PHS disconnect command to the CPU 238 via the serial communication port 244 (S2440). The received data is temporarily stored in the SRAM 204 via the HDLC controller 227. The MPU 201 transmits the stored data to the PC via the RS232C controller 219 (S2441).

When a slave unit responds, the CPU 238 sends a response command to the MPU 201 via the serial communication port 244. The MPU 201 outputs a data-reception-halt command to the PC via the RS232C controller 219

(S2442). Further, the MPU 201 sends a response to the ISDN side and establishes connection with the ISDN (S2443). For instance, when the channel B1 is connected and the data is PPP data, the port 258 is connected with the port 257 using the switch 231. Then, the port 257 is connected with the port 255 using the switch 231 (S2444). Further, the MPU 201 instructs the CPU 238 by sending a command via the serial communication port 244, so as to establish a path in the PHS baseband processor 239 by connecting the 32 Kbps data communication line 251 with the RF unit 241 (S2445). The received data is temporarily stored in the SRAM 204 via the HDLC controller. The MPU 201 transmits the stored data to the PIAFS controller 228 and further to the I.460 data conversion processor 236 where speed conversion is performed, and outputs the converted data to the PHS engine unit 237. If the data is PIAFS data, the port 258 is connected with the port 254 using the switch 230, then further connected to the port 254 by the switch 231 (S2444). Further, the MPU 201 instructs the CPU 238 by sending a command via the serial communication port 244, so as to establish a path in the PHS baseband processor 239 by connecting the 32 Kbps data communication line 251 with the RF unit 241 (S2445) The MPU 201 transmits the received data to the PIAFS controller 228 and further to the I.460 data conversion processor 236, where speed conversion is performed, and outputs the converted data to the PHS engine unit 237.

(2) Control Operation of CPU 206

Figure 27:
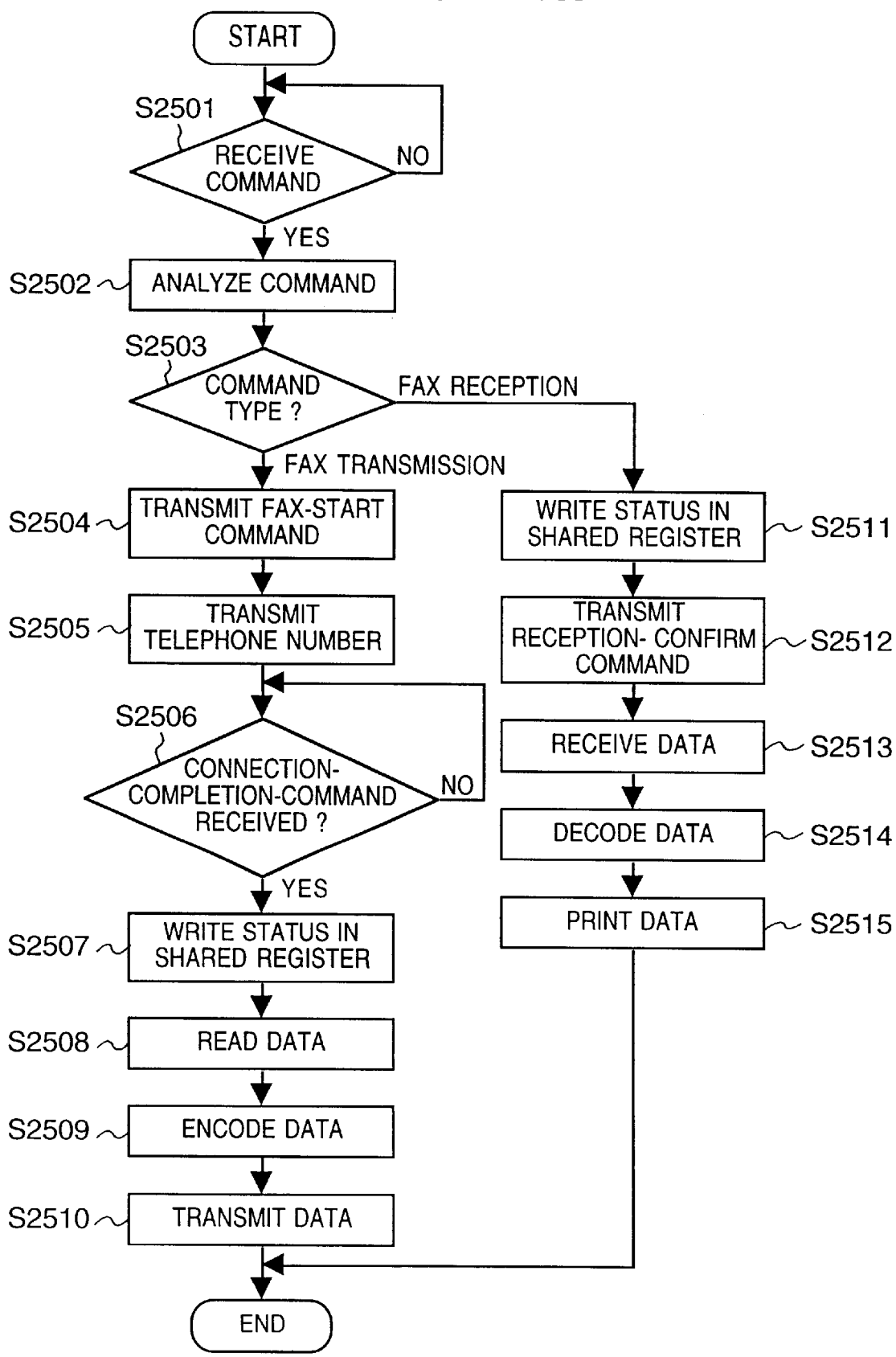
FIG. 27 is a flowchart describing control operation of the CPU 206.

FIG. 27 is a flowchart describing communication control operation of the CPU 206.

In the FAX engine unit, when key input is performed through the operation panel 210, or when a command is sent by the PC via the parallel communication interface port 211, or when a command is sent by the MPU 201 via the serial communication port 243 (S2501), the command is analyzed (S2502) and operation of respective peripheral device is started. When key input is performed through the operation panel 210, or the command is sent by the PC via the parallel communication interface port 211, and if the command is for a peripheral device beyond the control of the CPU, the command is sent to the MPU 201 via the serial communication port 243. The status of the peripheral device whose operation has started, is written in the shared register 218.

For instance, when a FAX transmission command is sent by the PC via the operation panel or the parallel communication interface port 211 (S2503), a FAX-start command (S2504) and a telephone number (S2505) are sent to the MPU 201 via the serial communication port 243. Upon receiving a connection-completion-command from the MPU 201 (S2506), the statuses of color scanner and FAX modem are set in the used state in the shared register (S2507). Then, the color scanner 209 is operated to read the data (S2508), the read data is coded by using the FAX modem (S2509) and the data is sent to the analogue switch 217 (S2510).

Moreover, for instance when a FAX reception command is transmitted by the MPU 201, the statuses of color printer and FAX modem are set in the used state in the shared register (S2511), and a FAX-reception-confirmation command is sent to the MPU 201 via the serial communication port 243 (S2512). Upon receiving data from the analogue switch 217 (S2513), the data is decoded by using the FAX modem 213 (S2514) and printed out by the color printer 208 (S2515).

(3) Control Operation of CPU 238

Figure 28:
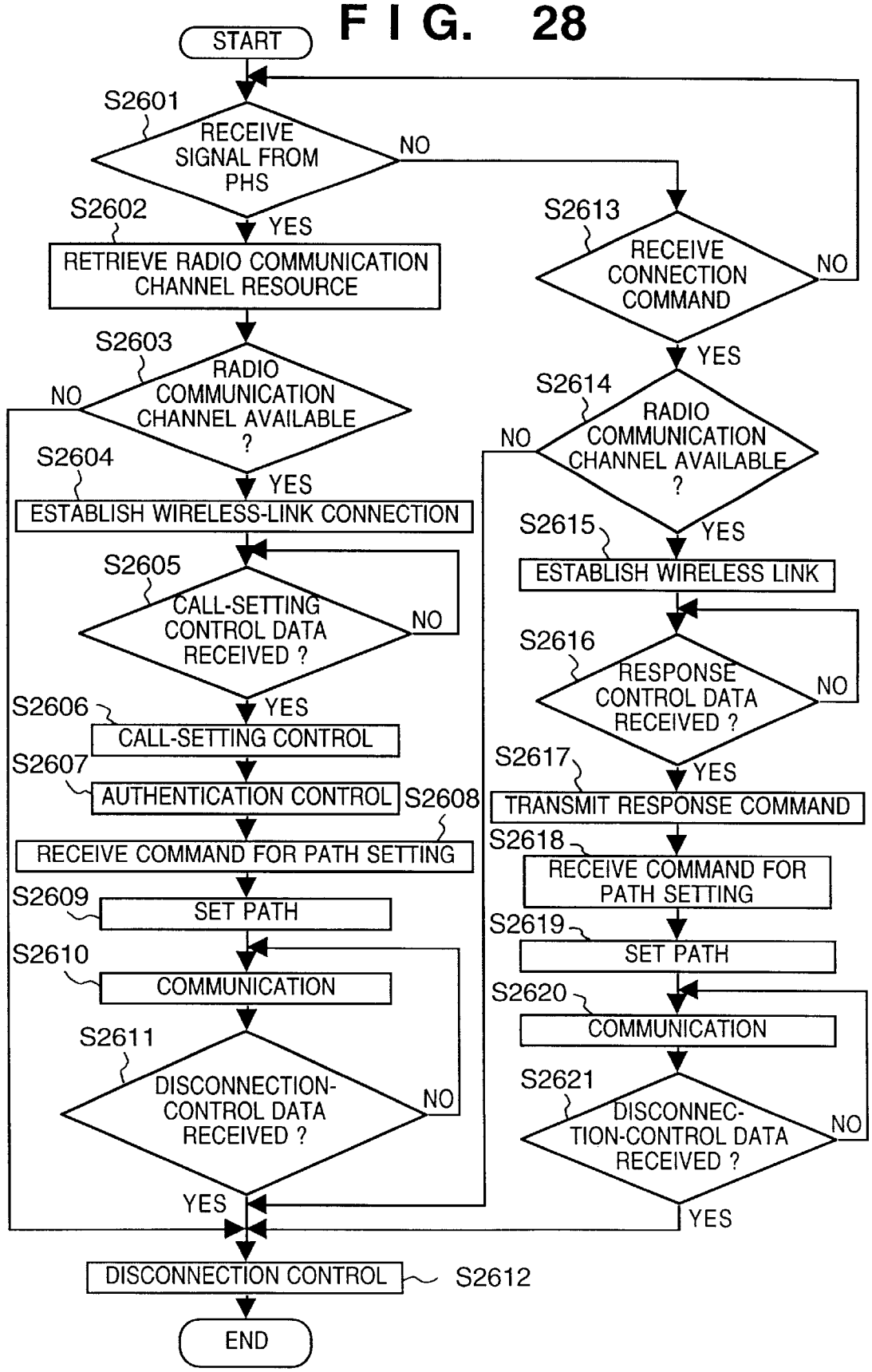
FIG. 28 is a flowchart describing control operation of the CPU 238.

FIG. 28 is a flowchart describing control operation of the CPU 238.

In the PHS engine unit 237, when the CPU 238 receives a signal through the PHS baseband processors 239 and 240 (S2601), the CPU 238 retrieves a radio communication channel resource (S2602). If the radio communication channel resource is available (S2603), wireless link is established (S2604). When the wireless link is established and call-setting control data is transmitted by a wireless slave unit (S2605), the CPU 238 sends a call-setting command to the MPU 201 via the serial communication port 244 (S2606). Upon receiving a call-setting-reception command, call command and response command from the MPU 201 via the serial communication port 244, the CPU 238 generates respective control data and sends them to the wireless slave unit. Further, the CPU 238 establishes radio communication by exchanging authentication data and the like (S2607). Then, the CPU 238 receives from the MPU 201 via the serial communication port 244, a command for setting the path of the PHS baseband processor (S2608). According to the command, the CPU 238 transmits the data, sent from the RF unit 241 (240) at 32 Kbps, to the path 248 (250) where data is expanded and outputted at 64 Kbps, or to the path 251 where data is outputted at 32 Kbps, or to the analogue signal path 245 (S2609). Then, data communication is started (S2610).

When disconnection-control data is transmitted by the wireless slave unit (S2611), the CPU 238 sends a disconnect command to the MPU 201 via the serial communication port 244 (S2612). Then the wireless link is disconnected.

Next, transmission operation to the PHS side is described.

When the CPU 238 receives a connection command from the MPU 201 via the serial communication port 244, the CPU 238 confirms an availability of a radio communication channel (S2614), and if it is available, establishes a wireless link (S2615). Upon receiving response data from the wireless slave unit (S2616), the CPU 238 transmits a response command to the MPU 201 via the serial communication port 244 (S2617). Further, the CPU 238 receives from the MPU 201 via the serial communication port 244, a command for setting a path of the PHS baseband processor (S2618). According to the command, the CPU 238 transmits the data, sent from the RF unit 241 (240) at 32 Kbps, to the path 248 (250) where data is expanded and outputted at 64 Kbps, or to the path 251 where data is outputted at 32 Kbps, or to the analogue signal path 245 (S2619). Then, data communication is started (S2620).

When the CPU 238 receives a disconnect command from the MPU 201 via the serial communication port 244 (S2621), the CPU 238 disconnects the wireless link (S2612).

Besides the above, when a sound-generation command is transmitted by the MPU 201 via the serial communication port 244, the CPU 238 outputs the designated sound, using the sound source of the PHS baseband processor 239, to the designated path (analogue signal path 245, path 248 where data is outputted at 64 Kbps, or path from the RF unit 241).

As set forth above, according to the radio communication apparatus and communication system according to the above-described embodiments, since a PC and a terminal adapter can communicate with each other via radio, it is possible to use the PC even if the location of the PC is remote from the connector of the public communication line.

Furthermore, since the radio communication apparatus and communication system incorporate the functions of terminal adapter, facsimile printer, scanner and PHS master unit, it is possible to save the space and attain excellent cost-performance. By this, communication is enabled by using an arbitrary unit selected from a wireless data terminal, data terminal connected via cable, wireless telephone unit, handset, facsimile or the like.

Furthermore, since different computers (CPU) are used by the facsimile processor and other processors, the present invention can be realized without changing the circuit structure of the conventional facsimile.

Further, since the terminal adapter has functions as a printer, scanner, facsimile and telephone unit which are integratedly controlled, the operability is improved, space is saved and cost is reduced.

Moreover, since the structure employs multiple CPUs and shared register, the functions of terminal adapter and PHS master unit can be added to the conventional facsimile apparatus without requiring any changes. Thus, a highly-expandable radio communication apparatus can be realized.

Furthermore, for instance, a data terminal (PC or the like) connected via cable, or a wireless data terminal (PIAFS-compliance terminal), or a wireless telephone unit (PHS telephone unit) can be connected to the public communication line.

Further, for instance, two channels of ISDN can be effectively utilized so as to enable data transmission while communicating with a wireless telephone unit.

Still further, for instance, two, the data terminal (PC or the like) connected by cable, wireless data terminal and/or wireless telephone unit, can be simultaneously connected to the ISDN.

Furthermore, for instance, in a case where the communication system includes a data terminal and plural wireless telephone units, two, the data terminal and/or plural wireless telephone units, can be simultaneously connected to the ISDN.

Moreover, for instance, two, the data terminal, wireless telephone unit and/or handset belonging to the radio communication apparatus main body, can be simultaneously connected to the ISDN.

Furthermore, for instance, data complying with the radio-data-transmission protocol (PIAFS) can be transmitted to a destination which does not comply with the radio-data-transmission protocol.

Further, for instance, even in a case where the destination does not comply with the PIAFS, data transmitted by a wireless data terminal can be sent to the destination.

Moreover, for instance, data transmitted by a wireless data terminal at 32 Kbps, can be transmitted to the ISDN having transmission speed of 64 Kbps.

Further, for instance, in a case of audio data communication, a path optimized for each data communication can be selected.

Still further, the communication system according to the present embodiment realizes facsimile function and efficiently utilizes each of the resources in the system.

Furthermore, for instance, PCM conversion processing of wireless communication data and PCM conversion processing of analogue signals are performed by a common analogue/digital conversion processor. Therefore, the size and cost of the system can be reduced.

Moreover, line echo generated during communication can be removed, and data during data communication can be transmitted without a change.

Further, it is possible to determine that echo cancel processing is not necessary for data transmitted by a data terminal connected via cable.

Furthermore, it is possible to print data transmitted by a wireless data terminal.

Still further, it is possible to transmit image data read by a scanner to a wireless data terminal.

Moreover, even if there is a difference in the processing speed between the processor of radio-data-transmission protocol and printing means or reading means, printing is possible without data overflow.

Furthermore, the structure of conventional facsimile can be utilized without making a large change, and radio communication processing function can be realized.

Further, for instance, since the DSU function is incorporated, no wiring work is necessary, set-up space can be saved, and also other ISDN terminal can be connected via bus.

Moreover, data can be transmitted/received in unit of byte, by adjusting timing of serial data having different phases.

Furthermore, data error can be prevented even if there is a phase difference between a clock extracted from the digital public communication line and a clock of the digital radio communication controller.

Further, the digital public communication line and digital radio communication line can be operated in synchronization. Accordingly, data underrun and overrun can be prevented.

Moreover, even in a case where the precision of clock signals extracted from the digital public communication line become temporarily poor, the precision of the clock signal operating the digital wireless communication line are maintained within a predetermined precision range.

The present invention is not limited to the above embodiments and various changes and modifications can be made within the spirit and scope of the present invention. Therefore, to appraise the public of the scope of the present invention, the following claims are made.

What is claimed is:

1. A facsimile apparatus, connectable to a communication line, comprising:
   an interface for connecting a personal computer (PC) with said facsimile apparatus;
   radio communication means for performing radio communication with a wireless telephone unit;
   selecting means for selecting data from data transmitted by the personal computer and audio data transmitted by the wireless telephone unit; and
   transmitting means for transmitting the data selected by said selecting means to the communication line.

2. The apparatus according to claim 1, wherein said communication line includes a plurality of communication channels,
   said facsimile apparatus further comprises means for selecting a communication channel for outputting data, when the data transmitted by the personal computer or the audio data transmitted by the wireless telephone unit is outputted to the communication line, and
   said transmitting means transmits the data transmitted by the personal computer or the audio data transmitted by the wireless telephone unit to the selected communication channel of the communication line.

3. A radio communication apparatus, connectable to a digital public communication line and having function as a digital radio communication base station, comprising:

a wired interface for connecting a data terminal with said radio communication apparatus;

storing means for storing data transmitted by the data terminal via said wired interface;

converting means for converting the data stored by said storing means to serial data having a predetermined format;

radio communication means for performing radio communication with the data terminal or a wireless telephone unit;

selecting means for selecting desired one or two data from the data transmitted by the data terminal via said radio communication means, audio data transmitted by the wireless telephone unit and the serial data; and transmitting means for transmitting the data selected by said selecting means to the digital public communication line.

4. A facsimile apparatus, connectable to a communication line, comprising:

interface means for connecting a personal computer (PC) with said facsimile apparatus;

a handset for inputting audio data;

radio communication means for performing radio communication with a wireless telephone unit;

selecting means for selecting desired at least one data from data transmitted by the personal computer, audio data transmitted by the wireless telephone unit and the data inputted to said handset; and transmitting means for transmitting the data selected by said selecting means to the communication line.

5. The apparatus according to claim 4, wherein said interface means comprises:

a radio-data-transmission protocol processor;

input means for inputting data, transmitted by the data terminal, to said radio-data-transmission protocol processor;

storing means for storing the data received by the radio-data-transmission protocol processor; and converting means for converting the data stored by said storing means to serial data having different formats, wherein said selecting means selects desired at least one data from the converted serial data, the audio data transmitted by the wireless telephone units and the data inputted to said handset.

6. The apparatus according to claim 5, further comprising means for selecting whether or not the data, transmitted by the personal computer, is to be inputted to said radio-data-transmission protocol processor, wherein said selecting means selects desired at least one data from the converted serial data, the data transmitted by the personal computer before serial conversion, the audio data transmitted by the wireless telephone unit and the data inputted to said handset.

7. The apparatus according to claim 6, further comprising processing means for performing conversion processing (I.460) of converting transmission speed of data transmitted by the personal computer, in a case where the data is not inputted to the radio-data-transmission protocol processor.

8. The apparatus according to claim 5, further comprising:

a memory for storing the data received from the communication line in a case where the data selected by said selecting means is the data received from the personal computer;

means for converting the data stored in a memory, into a format of radio-data-transmission protocol at the radio-data-transmission protocol processor;

means for transmitting the converted data to the personal computer.

9. The apparatus according to claim 4, further comprising means for switching a signal selection combination selected by said selecting means in accordance with a type of data element included in a line connection control message transmitted by the wireless telephone unit or the personal computer.

10. The apparatus according to claim 4, further comprising:

reading means for reading an image;

printing means for printing image data;

modulating means for modulating a signal subject to transmission;

analogue signal selecting means for selecting either an analogue signal modulated and outputted by said modulating means or an analogue audio signal inputted to said handset; and an analogue/digital conversion processor for converting the analogue signal selected by said analogue signal selecting means to PCM (Pulse Code Modulation) data.

11. The apparatus according to claim 10, further comprising a plurality of decoding means for decoding time-division-multiplexed data received by radio, wherein said analogue/digital conversion processor comprises means for being connected with said decoding means on one-to-one basis.

12. The apparatus according to claim 4, further comprising:

means for connecting said selecting means with an echo canceller;

means for controlling the echo canceller not to perform echo cancel operation when data is transmitted by the personal computer; and means for controlling the echo canceller to perform echo cancel operation when data is transmitted by the wireless telephone unit or the handset.

13. The apparatus according to claim 12, further comprising means for controlling the echo canceller not to perform echo cancel operation, if a communication attribute included in an outgoing call request message, which is transmitted by the personal computer or the wireless telephone unit, is digital data.

14. The apparatus according to claim 4, further comprising:

a first connector for being directly connected with a station switch board of the communication line;

converting means for converting a signal received from the station switch board to a predetermined time-division-multiplexed digital signal;

input means for inputting the signal, converted by said converting means, into a driver/receiver circuit; and a second connector for being connected to said driver/receiver circuit via a transformer.

15. The apparatus according to claim 4, further comprising:

first conversion means for performing serial/parallel conversion of the data received from the communication line in synchronization with a clock extracted from the communication line; and second conversion means for performing parallel/serial conversion of the data, converted by said first conversion means, in synchronization with a radio communication line, wherein the data converted by said second conversion means is transmitted to the radio communication line.

16. The apparatus according to claim 15, wherein the data is transferred between said first conversion means and said second conversion means through a first-in-first-out (FIFO) buffer.

17. The apparatus according to claim 4, further comprising:
   means for assembling/disassembling a time-division-multiplexed frame;
   means for generating a multiplied clock synchronizing with the clock extracted from the communication line; and
   means for assembling/disassembling the time-division-multiplexed frame in synchronization with the generated clock.

18. The apparatus according to claim 17, wherein said multiplied-clock-generating means comprises:
   means for dividing the generated clock;
   means for comparing a phase of the divided clock with that of the clock extracted from the communication line;
   means for filtering the comparison result;
   means for inputting an output from said filtering means to a voltage control oscillator to alter a frequency of the clock to be generated in accordance with the phase difference; and
   control means for controlling such that the frequency of the generated clock is within a predetermined value.

19. The apparatus according to claim 4, further comprising means for receiving the data, received from the communication line, by the personal computer or the wireless telephone unit or the handset, which has been selected by said selecting means for data transmission.

20. A radio communication apparatus, connectable to a communication line, comprising:
   printing means for printing data;
   receiving means for wirelessly receiving data from a data terminal connected by radio; and
   means for causing said printing means to print the data received by said receiving means,
   wherein data from the data terminal is selectively and automatically routed to the printing means for printing or to another device via the communication line.

21. A radio communication apparatus, connectable to a public communication line, comprising:
   printing means for printing data;
   receiving means for wirelessly receiving data from a data terminal connected by radio;
   a radio-data-transmission protocol processor for processing the data received by said receiving means from the data terminal via radio communication;
   converting means for converting a format of the data processed by said radio-data-transmission protocol processor;
   means for causing said printing means to print the data converted by said converting means;
   a first data bus to which said printing means and/or a scanner is connected;
   a second data bus to which said radio-data-transmission protocol processor is connected;
   a shared register to which said first data bus and said second data bus are connected; and
   means for writing/reading the data, processed by said radio-data-transmission protocol processor, in said shared register,
   wherein said printing means prints the data inputted to said shared register.

22. The apparatus according to claim 21, wherein said first data bus and said second data bus are respectively connected to a first processor and a second processor, the first processor controlling said printing means and/or said scanner, and the second processor controlling said radio-data-transmission protocol processor.

23. A radio communication apparatus, connectable to a communication line, comprising:
   a scanner for scanning image data; and
   transmitting means for transmitting the image data, scanned by said scanner, to a data terminal connected by radio,
   wherein the image data is selectively and automatically routed to the data terminal via radio or to another device via the communication line.

24. A radio communication apparatus, connectable to a public communication line, comprising:
   a scanner for scanning image data;
   a radio-data-transmission protocol processor for processing the image data scanned by said scanner;
   converting means for converting a format of data processed by said radio-data-transmission protocol processor;
   transmitting means for transmitting the data, converted by said converting means, to a data terminal connected by radio;
   a first data bus to which printing means and/or said scanner means is connected;
   a second data bus to which said radio-data-transmission protocol processor is connected;
   a shared register to which said first data bus and said second data bus are connected; and
   means for writing/reading the data, processed by said radio-data-transmission protocol processor, in said shared register,
   wherein said printing means prints the data inputted to said shared register.

25. The apparatus according to claim 24, wherein said first data bus and said second data bus are respectively connected to a first processor and a second processor, the first processor controlling said printing means and/or said scanner, and the second processor controlling said radio-data-transmission protocol processor.

26. A radio communication apparatus, connectable to a public communication line and having function as a digital radio communication base station, comprising:
   interface means for connecting a data terminal with said radio communication apparatus by radio or by cable;
   a handset for inputting audio data;
   radio communication means for performing radio communication with at least one of a plurality of wireless telephone units;
   selecting means for selecting at least one data from data transmitted by the data terminal, audio data transmitted by the wireless telephone units and the data inputted to said handset;
   transmitting means for transmitting the data selected by said selecting means to the public communication line;
   modulating means for modulating a signal subject to transmission;
   analogue signal selecting means for selecting either an analogue signal modulated and outputted by said modulating means or an analogue audio signal inputted to said handset; and an analogue/digital conversion processor for converting the analogue signal selected by said analogue signal selecting means to PCM (Pulse Code Modulation) data.

27. A radio communication apparatus, connectable to a public communication line and having function as a radio communication base station, comprising:

interface means for connecting a data terminal with said radio communication apparatus by radio or by cable;

a handset for inputting audio data;

radio communication means for performing radio communication with at least one of a plurality of wireless telephone units;

selecting means for selecting at least one data from data transmitted by the data terminal, audio data transmitted by the wireless telephone units and the data inputted to said handset;

transmitting means for transmitting the data selected by said selecting means to the public communication line;

a first connector for being directly connected with a station switch board of the public communication line;

converting means for converting a signal received from the station switch board to a predetermined time-division-multiplexed digital signal;

input means for inputting the signal, converted by said converting means, into a driver/receiver circuit; and a second connector for being connected to said driver/receiver circuit via a transformer.

28. A radio communication apparatus, connectable to a digital public communication line and having function as a digital radio communication base station, comprising:

interface means for connecting a data terminal with said radio communication apparatus by radio or by cable;

radio communication means for performing radio communication with at least one of a plurality of wireless telephone units;

first conversion means for performing serial/parallel conversion of the data received from the digital public communication line in synchronization with a clock extracted from the digital public communication line; and second conversion means for performing parallel/serial conversion of the data, converted by said first conversion means, in synchronization with a digital radio communication line, wherein the data converted by said second conversion means is transmitted to the digital radio communication line.

29. A radio communication apparatus, connectable to a communication line and having a function as a radio communication base station, comprising:

interface means for connecting a data terminal with said radio communication apparatus by radio or cable;

radio communication means for performing radio communication with a plurality of wireless telephone units; and generating means for generating a multiplied clock in accordance with the clock extracted from the communication line, wherein the radio communication is performed in synchronization with the. multiplied clock generated by said generating means.

* * * * *